(12) United States Patent
Aittaniemi

(10) Patent No.: US 11,193,250 B2
(45) Date of Patent: *Dec. 7, 2021

(54) MIGRATORY FISH PASSAGE ARRANGEMENT

(71) Applicant: KALASYDÄN OY, Rovaniemi (FI)

(72) Inventor: Tarmo Aittaniemi, Rovaniemi (FI)

(73) Assignee: KALASYDÄN OY, Rovaniemi (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,390

(22) Filed: Mar. 16, 2020

(65) Prior Publication Data

US 2020/0217032 A1    Jul. 9, 2020

Related U.S. Application Data

(63) Continuation of application No. 16/096,737, filed as application No. PCT/FI2017/050323 on Apr. 28, 2017, now Pat. No. 10,633,813.

(30) Foreign Application Priority Data

Apr. 29, 2016 (FI) ...................................... 20165371
Dec. 30, 2016 (EP) ...................................... 16207458

(51) Int. Cl.
*E02B 8/08* (2006.01)

(52) U.S. Cl.
CPC ................ *E02B 8/085* (2013.01); *E02B 8/08* (2013.01); *Y02A 40/60* (2018.01)

(58) Field of Classification Search
CPC ................................. E02B 8/08; E02B 8/0825
(Continued)

(56) References Cited

U.S. PATENT DOCUMENTS 1,380,384 A    6/1921  Howard
2,683,969 A    7/1954  Mugnier
(Continued)

FOREIGN PATENT DOCUMENTS

DE    100 03 761 A1    8/2001
EP    2098640 A2    9/2009
(Continued)

OTHER PUBLICATIONS

International Search Report and Written Opinion, dated Sep. 12, 2017, from corresponding PCT application No. PCT/FI2017/050323. Cited in the parent application.
(Continued)

*Primary Examiner* — Frederick L Lagman
(74) *Attorney, Agent, or Firm* — Nixon & Vanderhye

(57) ABSTRACT

A migratory fish passage arrangement arranges water flow past an obstacle upstream of the water's natural flow direction, and includes a hydraulic flow arrangement with a first intake tube from upstream of the dam from an intake point to a location downstream of the dam to a feeding point, where a fish gate allows fish to enter into an elevation tube, to enter from the feeding point in the water in the elevation tube to be transported in the elevation tube to an outlet upstream of the dam. The intake point is higher than the outlet. Also disclosed is a system to guide a migratory fish to pass a dam that includes the migratory fish passage arrangement and additionally a siphon tube from an upstream location with respect to the dam to a downstream location with respect to the dam to constitute a migratory fish return route.

23 Claims, 21 Drawing Sheets

Figure 1:
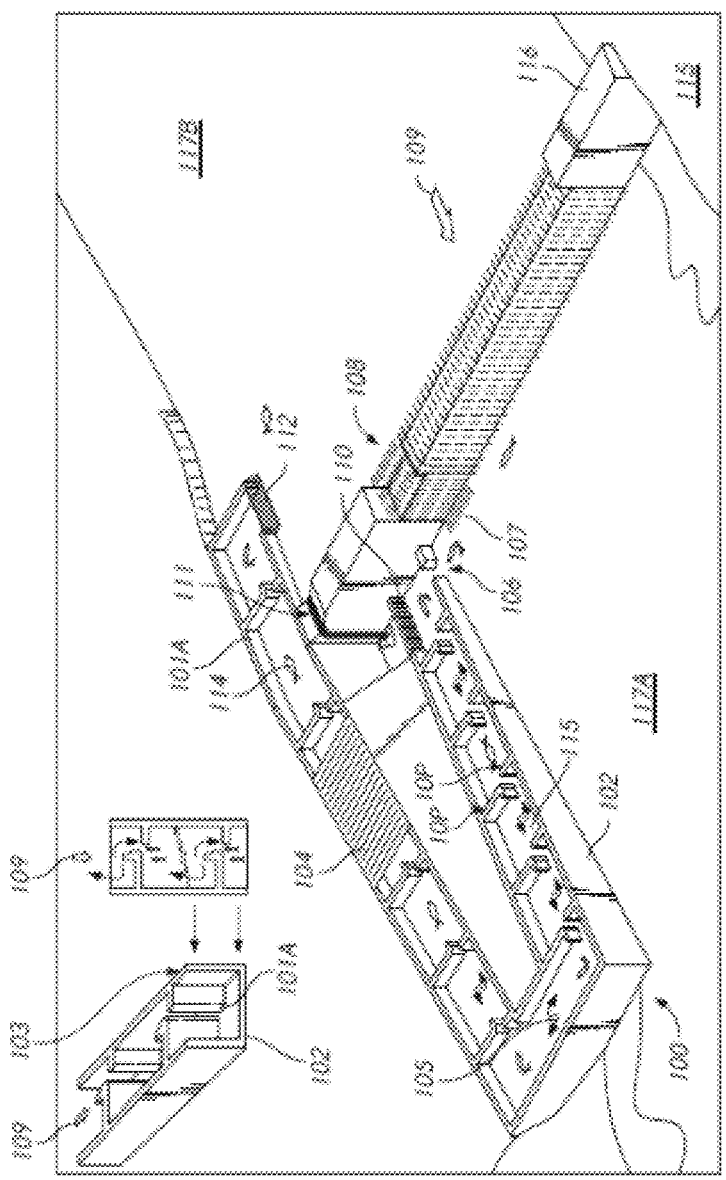

(58) Field of Classification Search
USPC .................................................... 405/81, 83
See application file for complete search history.

(56) References Cited

U.S. PATENT DOCUMENTS

| | | | |
|---|---|---|---|
| 3,038,760 | A | 6/1962 | Crooke |
| 3,772,891 | A | 11/1973 | Raistakka |
| 4,260,286 | A | 4/1981 | Buchanan |
| 4,431,340 | A | 2/1984 | Truebe et al. |
| 4,437,431 | A | 3/1984 | Koch |
| 4,629,361 | A | 12/1986 | Zimmerman |
| 5,161,913 | A | 11/1992 | Boylan |
| 5,558,462 | A * | 9/1996 | O'Haver ............... A01K 79/02 405/81 |
| 5,632,572 | A * | 5/1997 | Chicha .................. E02B 8/08 405/81 |
| 5,660,499 | A * | 8/1997 | Bethune ............... E02B 8/085 405/83 |
| 5,947,640 | A * | 9/1999 | Connors ............... E02B 5/005 137/372 |
| 6,347,908 | B1 * | 2/2002 | Safwat ................ E02B 8/085 405/81 |
| 6,394,699 | B1 | 5/2002 | Neufeld |
| 8,262,317 | B1 | 9/2012 | Jensen |
| 8,550,747 | B2 | 10/2013 | Millard |
| 8,550,748 | B2 | 10/2013 | Millard |
| 10,633,813 | B2 * | 4/2020 | Aittaniemi ............ E02B 8/085 |
| 2012/0148344 | A1 * | 6/2012 | Seo ....................... E02B 8/085 405/81 |
| 2013/0236249 | A1 * | 9/2013 | Greif ..................... E02B 8/08 405/81 |
| 2014/0356070 | A1 | 12/2014 | Stromotich |
| 2015/0247300 | A1 | 9/2015 | Seo |
| 2016/0017558 | A1 | 1/2016 | French, Sr. |

FOREIGN PATENT DOCUMENTS

| | | | | |
|---|---|---|---|---|
| EP | 3156546 | * | 4/2017 | |
| FI | 55071 | C | 5/1979 | |
| JP | 2001-040645 | A | 2/2001 | |
| JP | 2016-027224 | A | 2/2016 | |
| KR | 2000-0067278 | A | 11/2000 | |
| NL | 1021537 | C2 | 3/2004 | |
| SE | 427941 | B | 5/1983 | |
| WO | WO-2007011274 | A1 * | 1/2007 | ............. E02B 8/085 |

OTHER PUBLICATIONS

European Search Report, dated Jun. 21, 2017, from corresponding EP application No. 16 20 7458. Cited in the parent application.
Office Action issued in Japanese Patent Application No. 2019-508299 dated Oct. 27, 2020 with English translation provided.

* cited by examiner

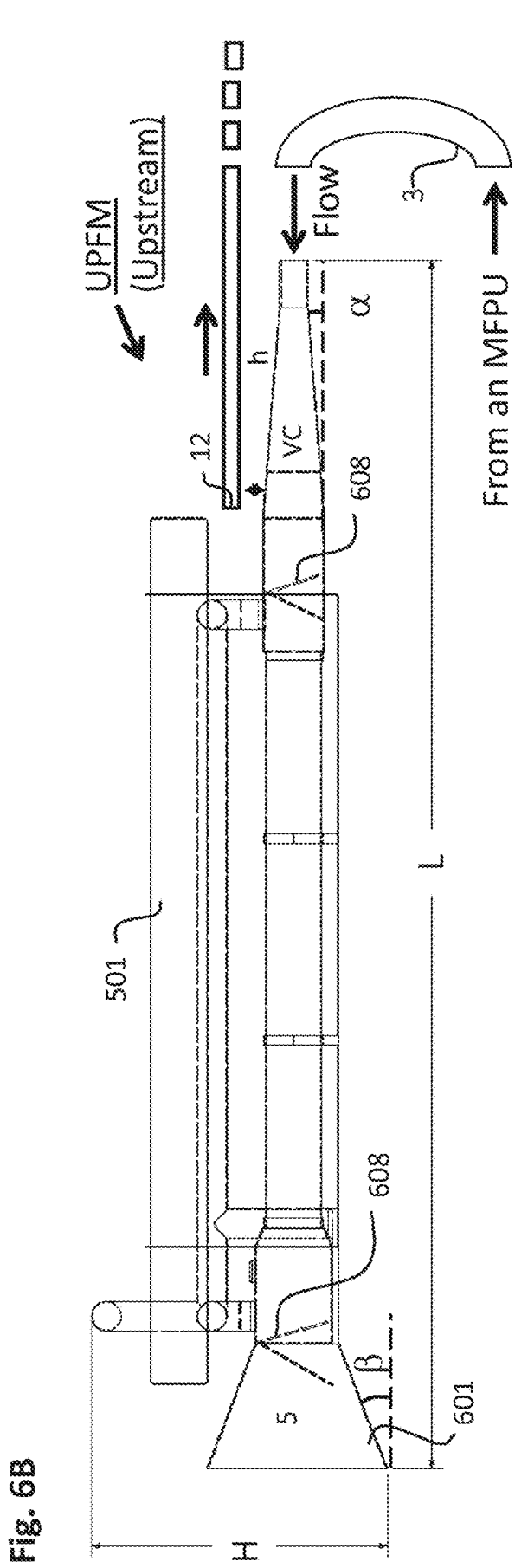

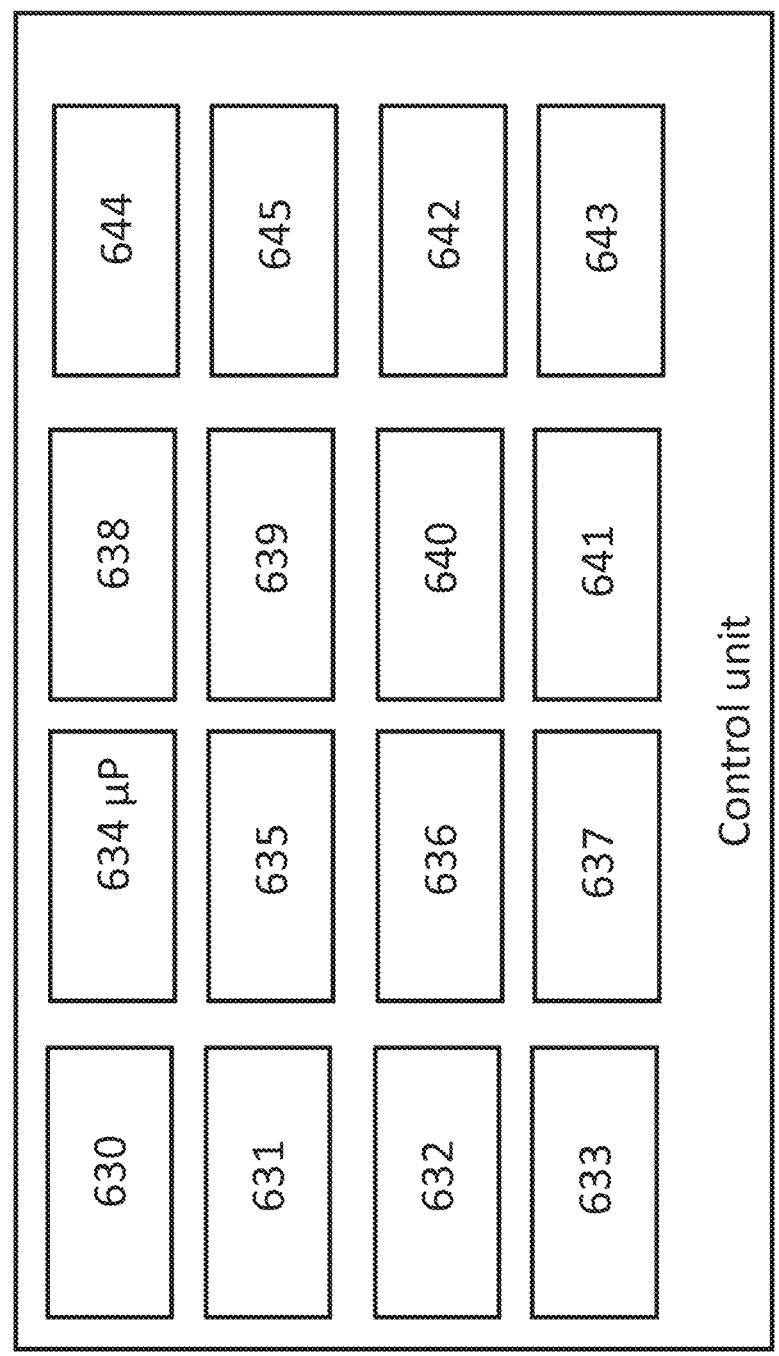

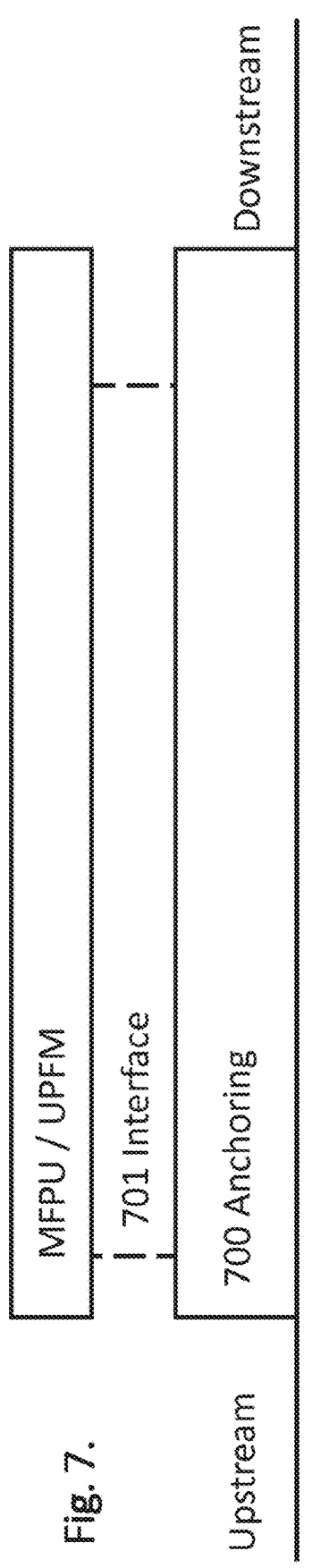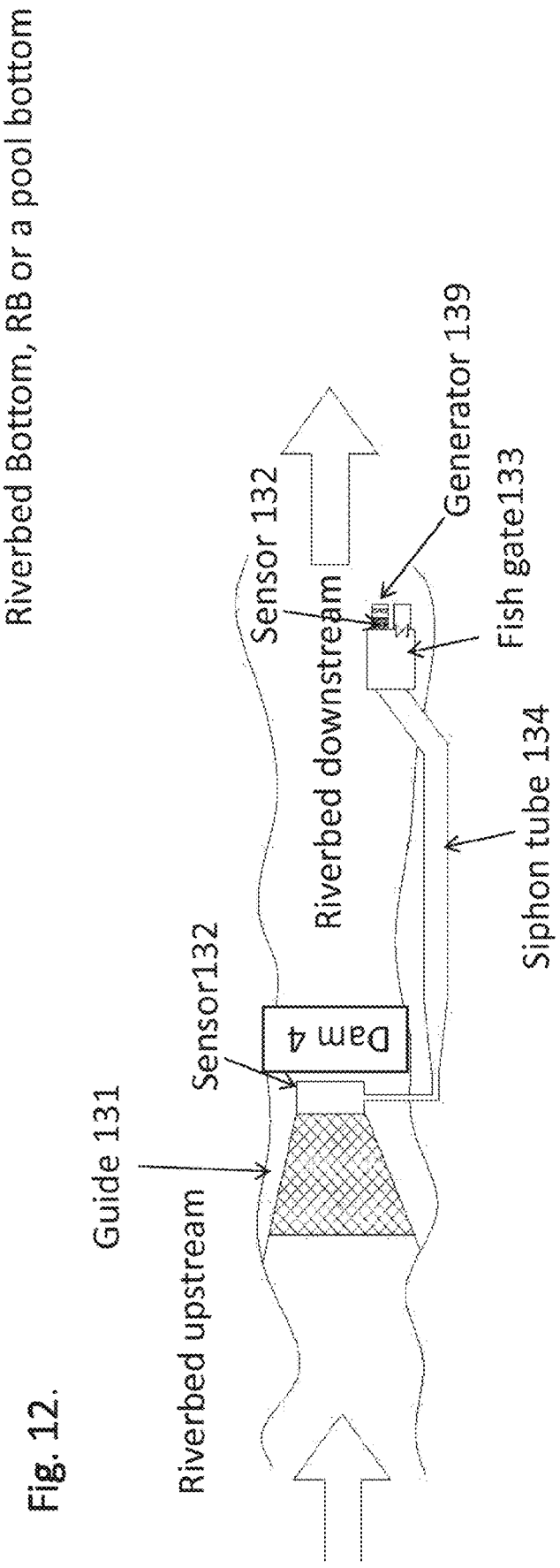

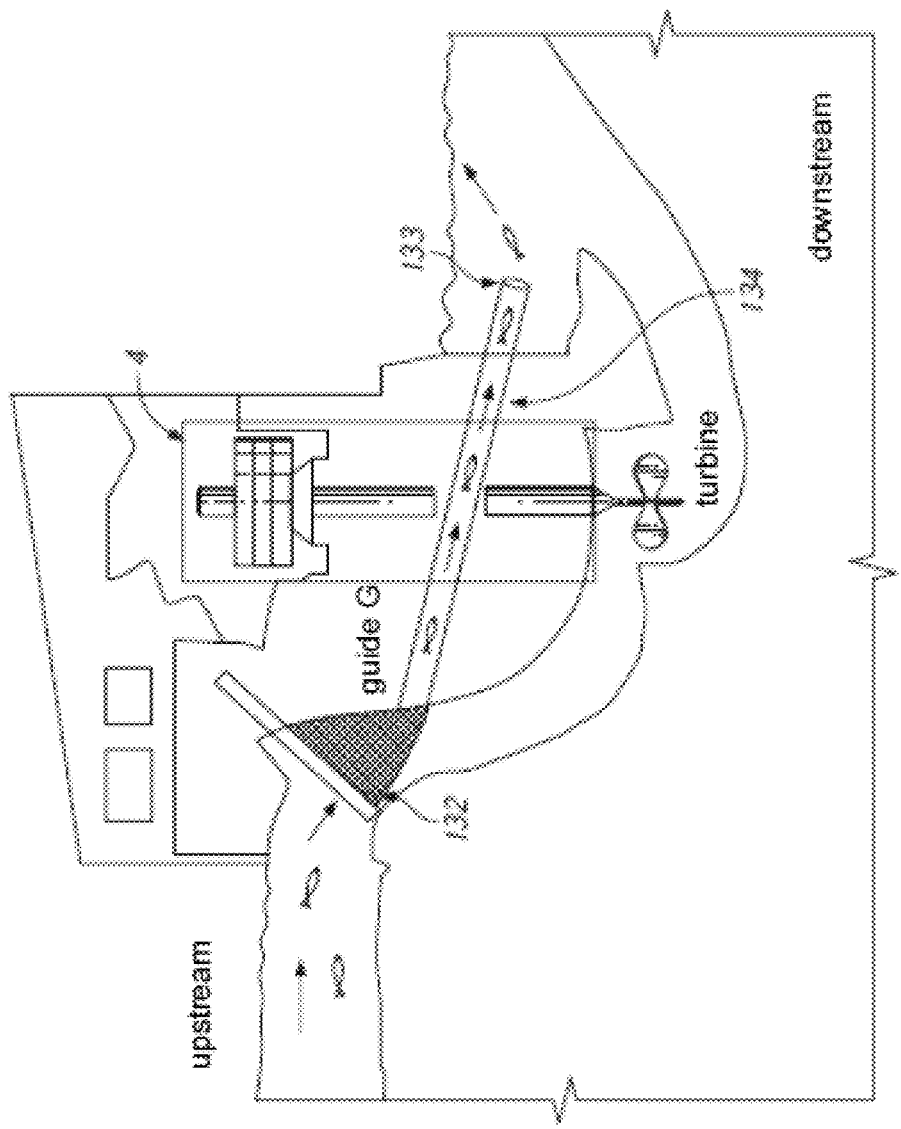

MIGRATORY FISH PASSAGE ARRANGEMENT

TECHNICAL FIELD

At a very general level, the embodiments of the invention are pertinent to a river system construction, but more specifically, to making such watercourses with non-disturbance of the river systems to allow migratory fish to spawn upstream even in built-up waters. However, even more specifically, the embodiments of the invention relate to a hydraulic flow arrangement in accordance with an independent claim preamble, the claim being directed to such a hydraulic flow arrangement. The embodiments of the invention relate also to a migratory fish passage unit for the implementation a system using the arrangement.

BACKGROUND

The need of human beings to build power plants in the energy production for the utilization of renewable energy sources consequently also produces direct damage to the nature itself, but additionally to the sources of livelihood, beneficial for the nature.

Migratory fish, especially Salmoniforms, the Anguilliformes, and/or alike, that migrate upstream back to their natal rivers to spawn encounter barriers in such rivers where the riverbed has been built with dams, such to be utilized in the industry of electricity production or in other power plants.

The passage over the power plant is blocked if no passing watercourse has been built. Even if there were such, the path of young migratory fish back downstream can be difficult, especially if the fish have to go through turbine tunnels. The fish may get hurt, and thus exposed to diseases. On the other hand, the passage by fish path passing the turbine tunnel wastes water, as does a fish ladder, out of which the latter is also quite expensive to build, but also leaves a mark on the landscape. Additionally, the fish may get damaged in the shallow pools when jumping from one to another, to yield a high risk of diseases.

On a further other hand, salmon fish, for example, are not attracted to going into deep waters, which in its part makes it difficult for young fish to return into the turbine tunnels or the passing by tunnels.

FIG. 1 discloses a fish ladder example in accordance with a known technique that facilitates access as such for the migratory fish 114 to swim upstream the flow, and thus cross the dam 116 which is crossing the watercourse 117A, 117B. As the FIG. 1 indicates, the fish ladder is quite heavily built, poorly if at all fitting to the landscape, but also expensive to construct, by casting the concrete, with the reinforcing and foundation works, including also the materials, the need of which is remarkable for such a large construction. The assembly of such also lasts long with all the land excavations that potentially mess up the landscape 115 and potentially also the waters downstream in the vicinity of the fish ladder.

In the example of the FIG. 1, the fish ladder 100 has been arranged by a structure to pass the watercourse 117A, 117B (the bending of the whole path of the watercourse would be even more expensive, if not the by-pass passage 100 done. Probably the energy obtainable from the flowing water 109 would not be utilizable, or just poorly if not at all during the constructions).

The water flowing in the riverbed of the terrain 115 (117A—downstream, 117B—upstream of the river bed) flows 109 partly via compartments with slots 101A, forming a channel 102 with a deepness 103 that are in communication together to the flow 109. The safety net 104 covers two such compartments, including under the net covered also the intermediate parts. The fish passage 100 has been arranged as gently ascending so that the elevation angle is 1:18-1:30, being gentler than the vertical climb of the dam 116 at the overflow 111 position, or at the middle of the dam 116 in the riverbed. Simultaneously, attraction water 107 from the upstream location of the riverbed 117B is flowing via the fish passage 100, so that the fish 114 find the entrance 106 of the fish passage 100 to swim upstream 117B the channel 102. The compartments with slots 101A are provided with small pass-through gates, wherein each compartment 101A can have a pool or a part thereof in which the fish 114 can rest between the rising steps, but the FIG. 1 also illustrates a compartment that is operative at the halfway as a resting pool 105 as a part of the fish ladder 100.

The disclosed example illustrates also that trash migration has been restricted by a diffuse net 110 at the downstream and by a trash sieve 112 upstream at the outlet 113 of the fish passage 102. Over flooding can be arranged as such by a spillover formation 108, 111 to some extent to produce attraction water 107 over the dam 116.

As an insert in FIG. 1 there is an illustration of the fish ladder structure at the left hand side corner, illustrating as an example of a compartment with slot 101A as a part of the fish ladder 100 to form a channel 102 structure of the passage 100. Depth 103 of a compartment and the slot 101A has been also illustrated in the FIG. 1. The gate formations 10$p$ as a slot of the channel 102 are also illustrated by the insert.

The ladder according to known techniques can be also as composing of a straight watercourse being mounted into a biased elevating angle from a downstream location to an upstream location.

Thus the present designs of the solution of the water power plants cause that the fish reproduction, sports fishing activities and their derivatives, power plant electricity production and the aspects of the landscaping are in an intercourse, although big money and made efforts could to some extent provide marginal mitigation or a compromised solution to the afore-cited problems. Additionally, in many cases other aspects than energy production are given secondary significance, consequently causing them to suffer the one-sided terms dictated solely by the energy production aspects.

SUMMARY

It is an object of the invention to mitigate the aforementioned problems. A solution according to the invention (as also cited as a migratory fish passage) is a hydraulic arrangement by which the afore-cited problems can be solved, or at least their influence is mitigated in a remarkable way, so that the cited collisions of interests can be solved, that are consequences of the utilization of the river systems or the river parts thereof in the current manner. In addition the suggested migratory fish passage is extremely economic and can in practice be landscaped out of sight, without essential losses to the functionality or to the electricity production.

Migratory fish passage in accordance with the embodiments of the invention has been characterized in the characterizing part of an independent claim directed thereto. A migratory fish passage according to an embodiment of the invention has a hydraulic flow arrangement, the hydraulic flow arrangement being characterized in an independent claim concerning the hydraulic flow arrangement, being characterized in the characterizing part of the independent claim thereof. A migratory fish passage unit according to an embodiment of the invention is characterized in an independent claim concerning the migratory fish passage unit.

According to an embodiment of the invention, the migratory fish passage has an elevation tube, intake tube, and a branching piece to connect them together, said branching piece further comprising a feeding point for the entrance of the fish to be directed into the elevation tube.

Migratory fish passage unit is embodied as means to implement the for the flow arrangement tubing in a compact way.

According to an embodiment of the invention, the hydraulic flow arrangement has the migratory fish passage according to an embodiment of the invention, wherein for arranging the water flow to flow in the riverbed, past a flow barrier in the riverbed, a dam, upstream said flow in the riverbed, the flow arrangement comprises a first intake tube from an upstream site with respect to the dam, from a water-intake position to a downstream position with respect to the dam at a feeding point, where there is a fish gate, being arranged to release a fish into a second tube, the elevation tube, from said feeding point to a release point upstream of said dam, the fish being elevated in the elevation tube in the water flow therein to the release point upstream of the dam, wherein said intake point is at a higher level than said release point.

The higher level is referring to an elevation in respect to an arbitrary level standard, at downstream, such as sea level for example, or another suitable level standard similarly used in construction engineering to define the heights of buildings in constructions. Thus, the higher level can in an embodiment mean also an upstream location further away from the dam, so to provide the height difference according to the riverbed descending to provide the pressure difference as in embodiments.

A flow barrier is considered such an obstacle to the natural flow of the water in the riverbed, which flow barrier the flowing water as such cannot pass without a separate passage as a pass by channel being arranged over the drainage tunnel or similar riverbed formation. Thus, the power plant dams are examples of the flow barriers that constitute especially barriers also to the migration of fish upstream to spawn. Although a fish ladder as a pass by channel as such has been arranged for the migration of fish upstream to spawn besides the essential riverbed, passing, passing over or under it, so that the passing by water is flowing in it, the passing by water does not flow in the natural riverbed, but in a large construction that may spoil the scenery to the river and/or to the shore.

The fish ladder as such as so interpreted does not actually prevent the water flow continuously, but instead especially the meandering implementations (for saving water flowing continuously) lengthen the distance that the water has to flow, but also slow down the water flow in a certain sense between the upstream and downstream location with respect to the dam to the direction from an upstream location to downstream location.

However, the fish ladder is not considered as an obstacle to the passing by water flow or a severe hindrance as such, although the flows in fish ladder occur along a different passage than the natural flow riverbed, or along a different passage than a fish ladder riverbed.

Within the provision that the natural water flowing facilitates (for example because of steep elevation of the river bed on average basis) to provide the water intake point on a higher level upstream the river than the release point, the elevation difference between the intake point and the release point can be utilized for compensating the tube-flow losses if necessary, i.e. according to an embodiment, the elevation difference can be selected to correspond to compensate tube-flow losses, if there were no such alternative implementations available, or it is wanted to make such implementation as an alternative to a pump power used to compensate the flow tube losses (i.e. the pressure loss because of the flow resistance), in accordance of the appropriate embodiment variants of the invention.

According to an embodiment of the invention, the hydraulic flow arrangement has a fish gate at the feeding point. Such a fish gate is arranged to open as a response to an observance of the initiation, such as the fish presence near the fish gate, detected by a suitable sensor. The fish gate can be a known fish gate as such, but being used in a use in accordance with an embodiment of the invention. According to an embodiment the observance of the fish is specified depending on the fish size, so that sufficiently large fish are detected to exceed the initiation threshold of opening the gate. The threshold can be set by a control unit.

According to an embodiment of the invention, there are means of feeding attraction water, downstream of the dam, from upstream of the dam by using an attraction water flow course.

According to an embodiment of the invention, the attraction water can be arranged to flow from the upstream location of the dam to downstream location of the dam by a siphon as such, to the feeding point or near it. According to an embodiment variant, the attraction water can be brought to the feeding point by an attraction water line, assisted by a pump, for example to compensate the tube flow losses caused by the pressure drop. According to an embodiment the attraction water line can provide attraction water also to several locations at the feeding line, or a plurality of such.

According to an embodiment of the invention, the hydraulic flow arrangement has at the feeding point an ejector formation to constitute a suction flow to feed the elevation tube from the feeding point towards the exit point. According to an embodiment of the invention, the ejector operation has been boosted by a pump that is arranged to bring water to the ejector formation, and/or to elevate the ejector's operating pressure, in order to promote the suction flow of the ejector, into which flow the fish are guided (by formation in the flow) for the elevation from the feeding point or a nearby location, by the suction and further through the elevation tube, to the exit point upstream the dam. According to an embodiment, the ejector can have an ejector formation with a choking region to increase the water speed for the suction.

According to an embodiment of the invention, the hydraulic flow arrangement has in its said first tube between the water intake position and the dam, or optionally after the dam but before the feeding point, a pump arranged to compensate the flow tube losses of at least one of the intake tube and/or elevation tube. According to an embodiment of the invention, the pumping power with respect to the flow and/or pressure is arranged to be adjustable. According to another embodiment, the adjusting feature is arranged to be independent from the water level at the upstream and/or downstream location from the dam, but according to a further variant in a way dependent on at least one of said locations. That way at least to some extent in the prevailing conditions of flooding or drought, it is possible to compensate the water depth influences on the water pressures inside the tubes of the migratory fish passage. According to an embodiment a control unit can be used to monitor the water level, and to adjust the pump accordingly, if needed for the set value maintenance.

According to a system according to an embodiment of the invention, to guide a migratory fish to pass a dam, the system comprises a hydraulic flow arrangement and in addition also a siphon tube from a location upstream of the dam to a location downstream of the dam to constitute a returning passage for the migratory fish.

According to an embodiment migratory fish passage unit has been used in the implementation of the siphon and/or the hydraulic flow arrangement in the system.

A system according to an embodiment of the invention has a separate siphon tube from the attraction water tube, but according to a variant of an embodiment of the invention the attraction water tube is at least in contact with or combined to said siphon tube, so as to facilitate the intake of the attraction water from said siphon tube with remarkably shorter attraction water tube branch than said siphon tube.

According to an embodiment of the invention, the system comprises a fish gate to open the flow when the fish is at the siphon tube, at the upstream location of the tube located fish gate.

According to an embodiment of the invention, the system comprises also a sensor to sense the fish presence at the gate location. The sensor can be implemented according to known techniques as such, but for the use in the embodiments.

According to an embodiment of the invention, the system can comprise additionally a dam or another corresponding flow barrier, water power plant, mill or another utility or device of electro-mechanical constitution, the water in the riverbed and/or the riverbed. According to a further embodiment, the system can comprise also a pump and/or the energy production unit of the pump, for example on-site the mechanical flow-energy utilizing unit, electricity producing unit, aggregate and/or a combustion boiler or a combustion engine.

According to an embodiment of the invention, in the system the siphon tube has at the near location a net formation to guide a fish to the siphon tube and/or to prevent the entrance of the fish into the turbine tunnels. According to an embodiment variant, the net formation has been arranged so that the fish cannot pass the mouth of the siphon tube for proceeding to the downstream of the dam by another route.

According to an embodiment of the invention, the system comprises at the siphon tube location a riverbed formation made for preventing snags or sawyers entering to the siphon tube and/or turbine tunnels. According to an embodiment of the invention, the system has a net arrangement to prevent the river system specific type of garbage from entering the siphon to clog them. For example large amount of leaves from trees can do so, if no garbage sifter. It is also possible to embody labyrinth structures from nets, so that in the riverbed waters between the surface and bottom moving garbage and/or sawyers can be caught when the labyrinth structures reach the heights from the bottom corresponding to the swimming height of the sawyers and garbage. The mesh size can be adapted according to the fish size in the river system and/or the garbage specific to the river system.

According to an embodiment a net can be replaced by a suitable guide for the fish guidance. Where appropriate, such a guide can be made of transparent material and/or guide can be perforated in suitable part to provide water passage between the guide sides. The perforation can be made with such holes that the fish to be guided do not fit to the holes where such prevention of entry is desired.

Other embodiments are indicated in the dependent claims and further examples shown.

In the hydraulic flow system according to an embodiment of the invention, the own internal pressure can be utilized, wherein the water actually goes at least twice pass the dam, first when constituting the operational flow in the intake tube, the flow to be used at the feeding point, and the second time in the elevational flow in the elevation tube. The operational flow can be assisted with a pump in an embodiment.

At the simplest embodiment of the invention, the intake tube is as an implementation of a siphon tube, but according to an embodiment variant of the invention the intake tube flow losses can be compensated with a pump attached thereto. According to an embodiment of the invention, the pump can be scaled to compensate the pressure drops of the elevation tube, via the pressure increase at the ejector location to some extent, and according to an embodiment variant according to the water level at the upstream and/or downstream location from the dam, correspondingly to the pressure difference variation at at least one of said locations, in suitable part.

According to an embodiment of the invention, concerning a solidly mounted embodiment, water is taken from an upstream location of the river, with respect to the dam, at a first water level or first height of water, as measured from a first reference height thereto, and the water is led to the downstream location with respect to the dam, in a first tube that is quite a broad tube, where at the downstream location there is a second tube, the elevation tube, leading the water from downstream location with respect to the dam to the upstream location with respect to the dam, to a second water level that is a shallower level than the first water level with respect to said reference level, wherein at the downstream location of the dam there is a fish gate arranged to open for a fish, to allow the entry of the fish into the elevation tube to be elevated in the hydraulic flow in the elevation tube from the downstream location of the dam to the upstream location of the dam. This way the pass-over-flow is restricted essentially efficiently to the attraction water when the fish gate is closed. The attraction water can be adjusted by a dedicated valve, or a group of such in control of control unit. According to a further embodiment, such a valve is controlled remotely by electrical signals, and/or a season timer. The attraction water is used to get the fish near to the fish get for the elevation. The pass-over-water's influence on electricity production efficiency is considered only marginal at most.

Then the entering fish is sucked, as a consequence of an ejector based and constituted flow, into the elevation tube via the embodied ejector formation and via the elevation tube, to get released upstream of the elevation tube end, to continue the voyage to the spawning site. According to an embodiment variant, the intake tube flow is boosted by a pump to ensure sufficient pressure for ensuring the elevation tube flow up to a certain water height with respect to the reference height. To make sure that the fish individuals with the most vitality are able to spawn and preserve the fish stock, the diameter of the elevation tube has been scaled in accordance of the size of the largest fish met in the river system. According to an embodiment, the elevation tube has been sized so that the diameter is at least 1.5 times larger than the largest fish dimension of a fish met in the river system, such dimension that is a largest measure of the fish at the cross-wise direction of the swimming direction of the fish. According to an embodiment variant, there is an ensemble of elevation tubes that each have different fish size specific dimension. In such an embodiment, the entry of the larger fish into the too small tubes has been restricted by guide formations for example, to classify the fish according to the size for the suitable elevation tube.

In practice the suitable part of the tubes can be buried into the shore or into the river bed bottom, as economically and maintenance specifically the landscaping being taken into account were reasonable and economic, however in essentially out of the sight and/or blending suitably into the landscape. In some embodiments, the industrial facilities may be such that the tubes may be left visible, purposely in sight, however within such a provision that they esthetically are estimated to fit to the environment. According to an embodiment, the tubes that the fish use are made of transparent materials. However, according to an embodiment, a buried tube or such part thereof is provided with a wave guide to make it easier for the fish to enter, if such a tube were hidden into the soil or into a large dark building. According to an embodiment the waters in such tubes can be provided with lights for the fish for their more natural-like migration arranged by the appropriate lighting. A control unit can control the lights.

The embodied operation scheme is economically effective and safe, also to the fish, so that the risk of fish getting sick as a consequence of an injury is remarkably diminished if considered in comparison to the traditional techniques applied to fish ladder passages and/or lifts utilizing techniques in the passage arrangements.

In addition a fish can spare its energy resources when elevating in the elevation flow, so a vital fish is doing well and the probability of surviving to the spawning site is higher than compared to the struggling of the fish at its extreme limits. It is probable that a strong fish in a better shape gets more posterities that are also healthier. However, on the flip side, also weaker fish can get through, but it is not a simple matter at all. Anyhow, it is estimated that the consequent upsurge of the fish stock is expected, also to provide such for the livings based on the fishing tourism as a local business.

Additional advantages of the embodied migratory fish passage comprise, e.g.:
The migratory fish passage can be mounted and landscaped out of the sight when necessary.
The tubes are remarkably economic when compared to the structures of concrete casts,
Service free,
Turbine-passing tunnels are not needed for the fish to pass them,
Practically negligible flow passing the dam,
Remarkably economic to purchase and built, the mounting is easy and economic,
Safe upstream migration for fish, too,
Fish stock upsurge expected,
The fish are doing well and are healthy after the migration upstream.
The migratory fish passage can gain added value also as shown in the following, not to limit only to the named aspects:
Applicable to the present dams, so that it is not necessary to have expensive special solutions to pass by the turbines,
Mounting the tubes is simple as such,
Economically efficient,
Fish are healthier and more vital, also at the spawning sites, so that the posterities also become more vital, especially as expected in long term, when migration upstream made via the migratory fish passage,
More rich fish stock, for recreational fishing in salmon rivers and/or other migratory fish rivers.

Local business based on fishing tourism becomes livelier.

Term "number" is meaning in the current application whatever positive integer number, starting from one (1), for example one, two or three.

Term "ensemble" refers to integer numbers, starting from number two (2).

Term "comprise" has been used as an open expression, also in the deflected forms.

Terms "point" or "location", for example feeding point or location, are meaning context defined point or location, tube end and/or branching-piece end, especially in connection with terms feeding point, water intake point, output point or location. Terms "a first" and/or "a second" etc. have been used to differentiate an object of one species from another object of the said same species, so not limiting the number of the object only to the named number of objects in the expression.

FIGURES

Figure 2:
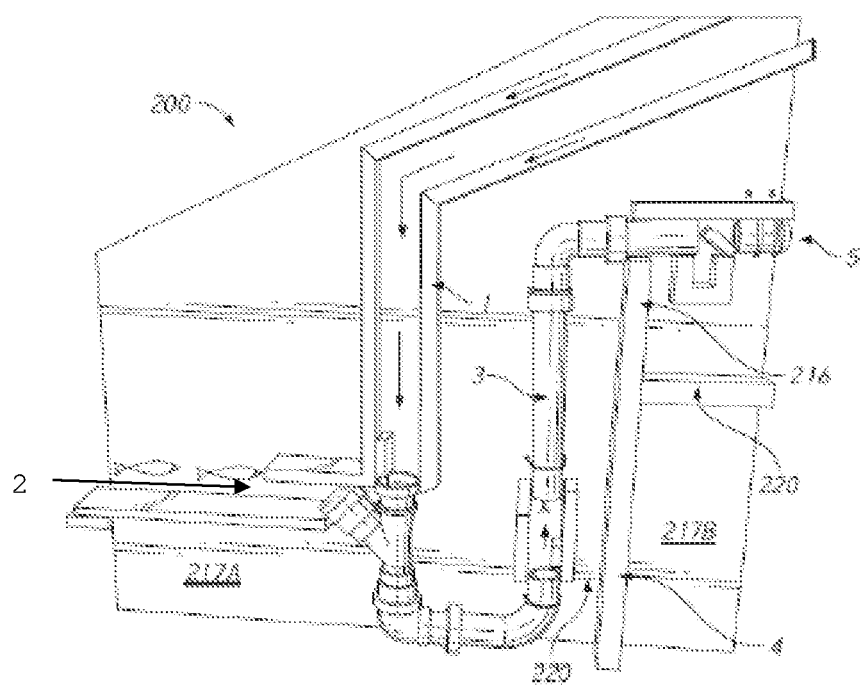
Figure 3:
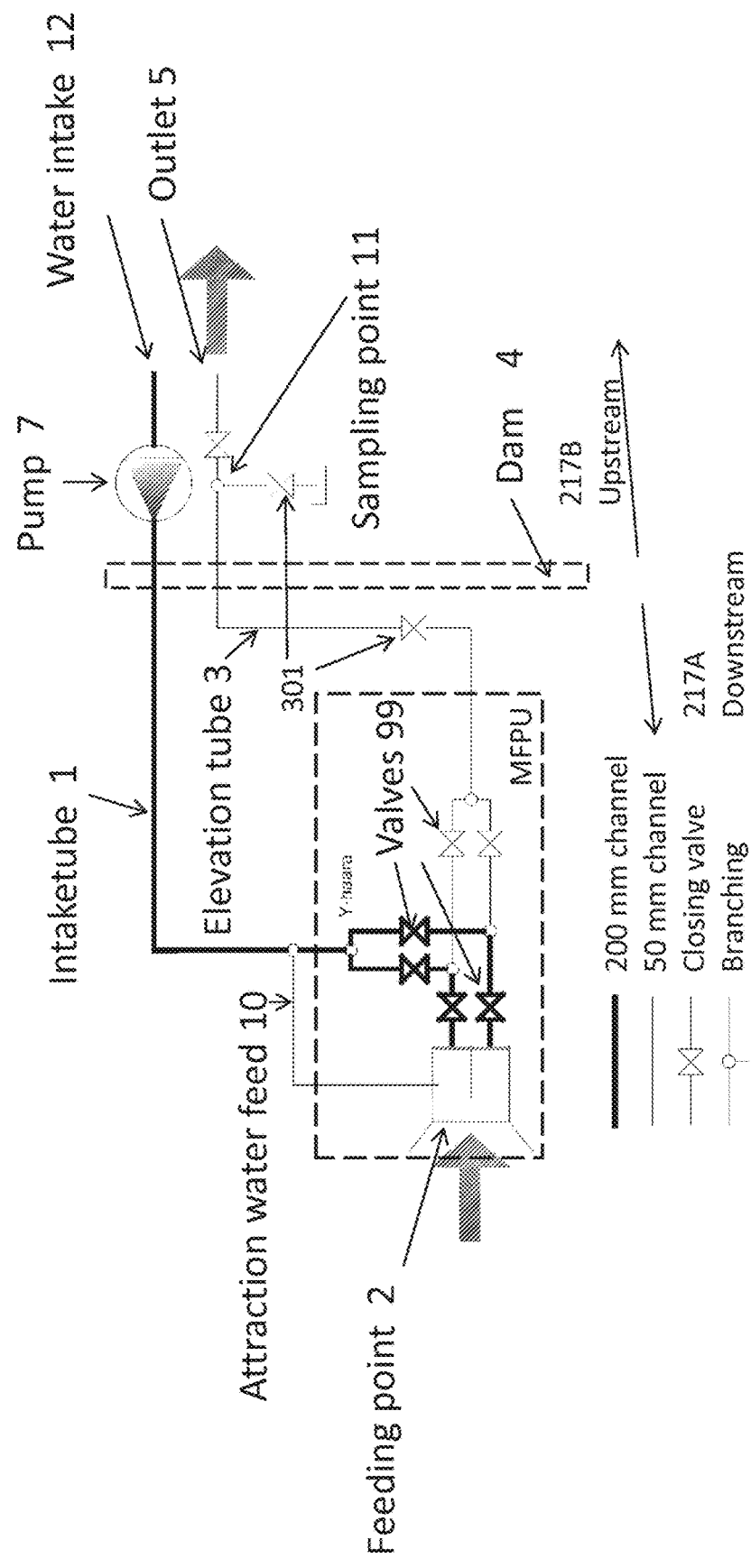
Figure 4:
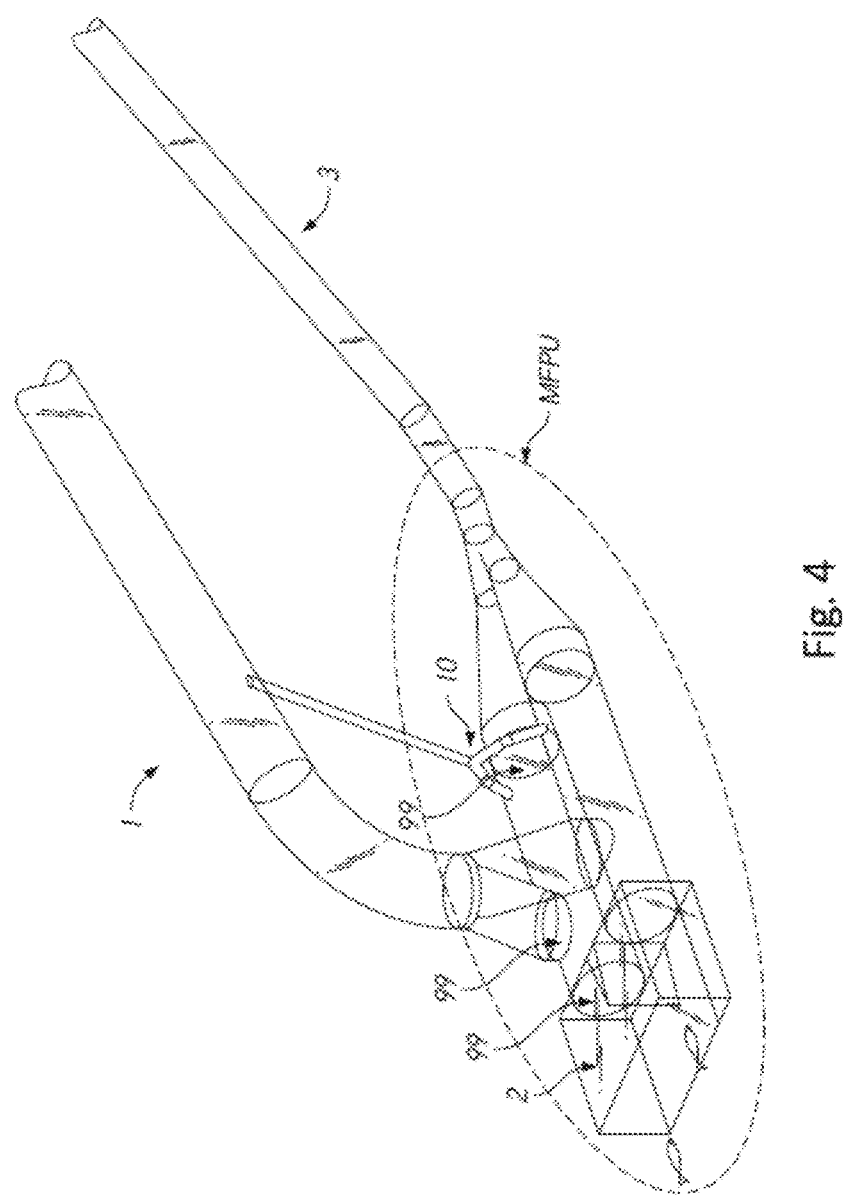
Figure 5:
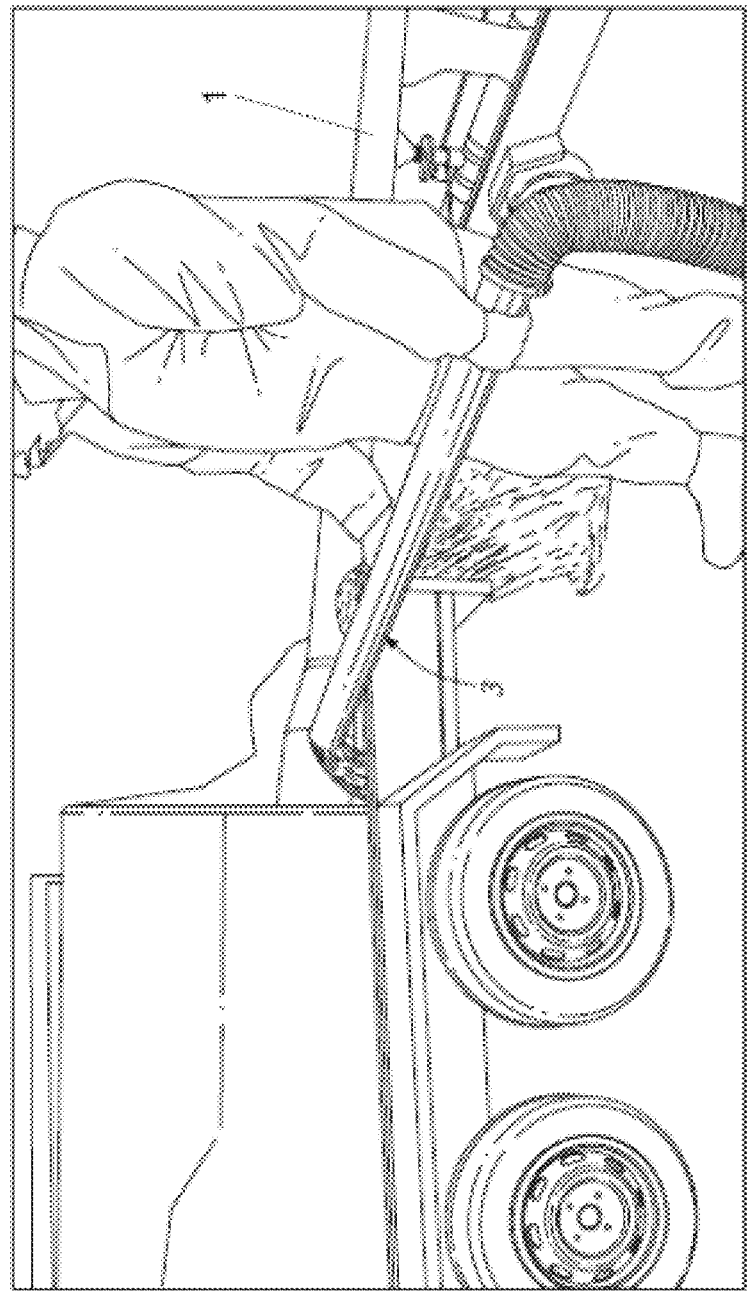
Figure 5A:
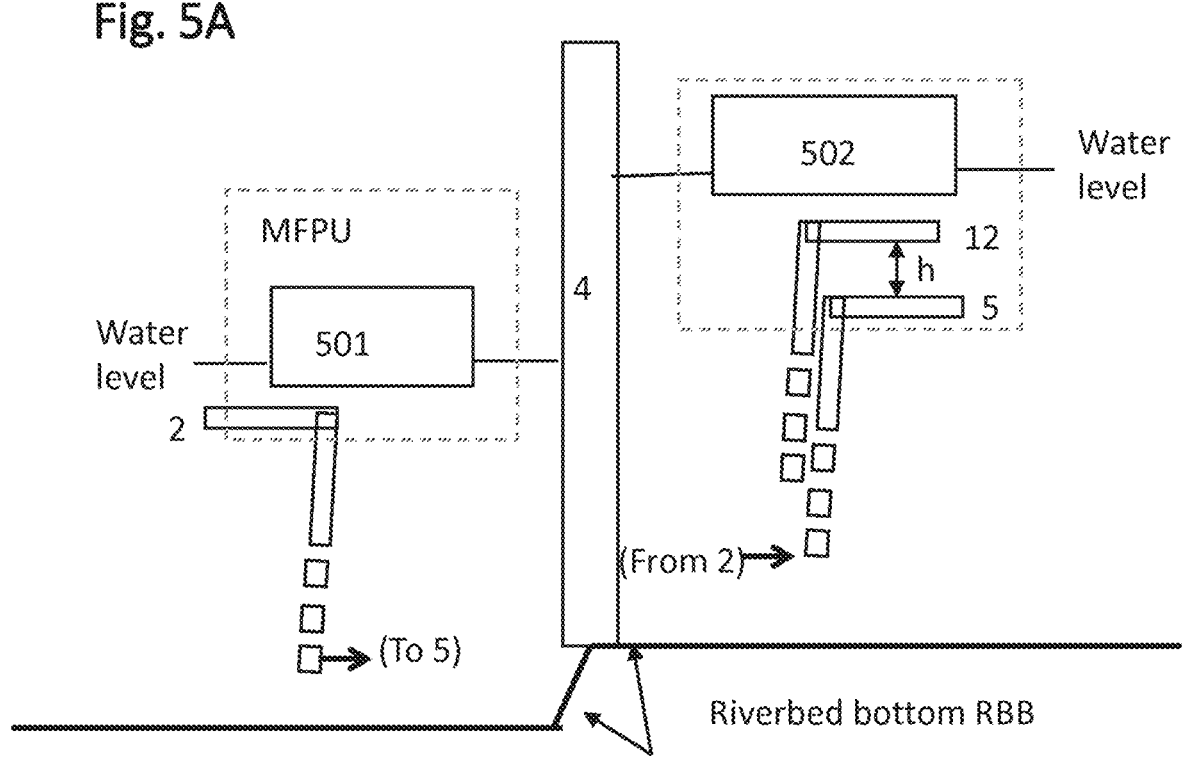
Figure 5B:
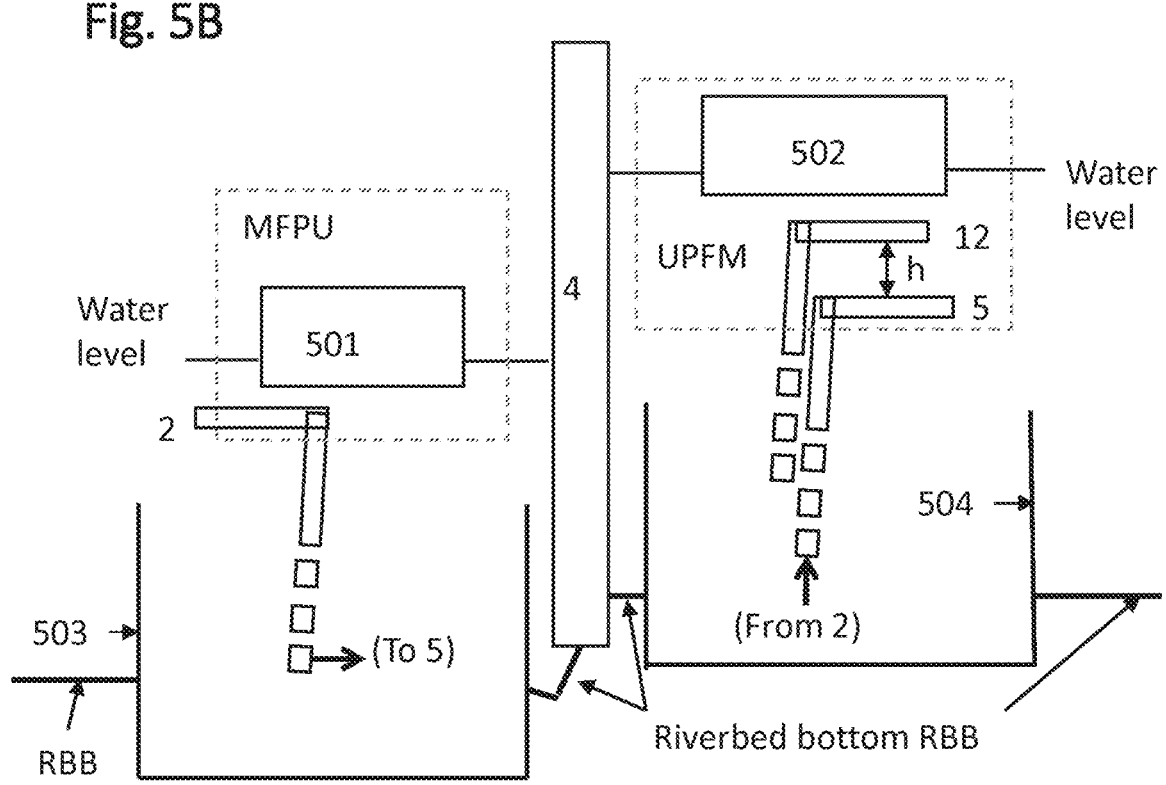
Figure 5C:
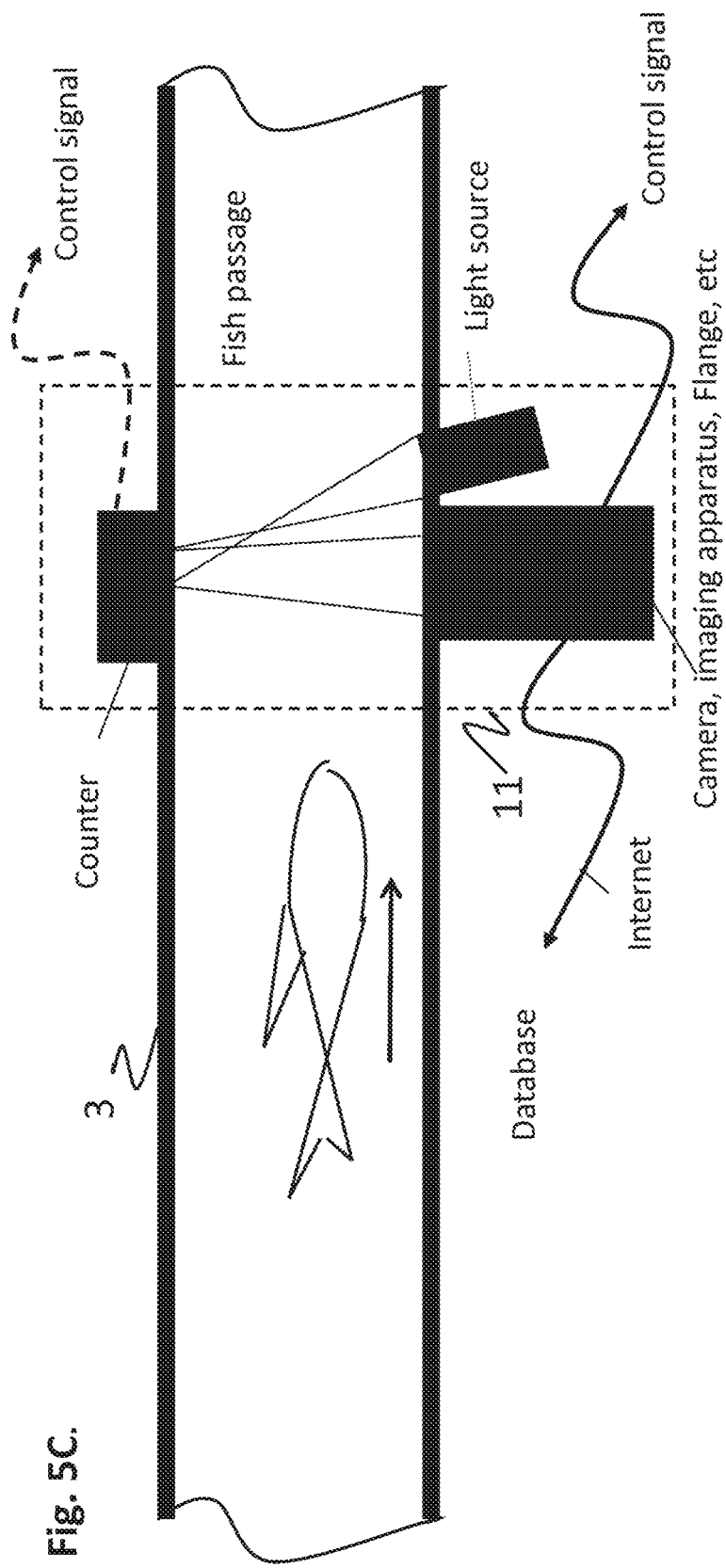
Figure 6:
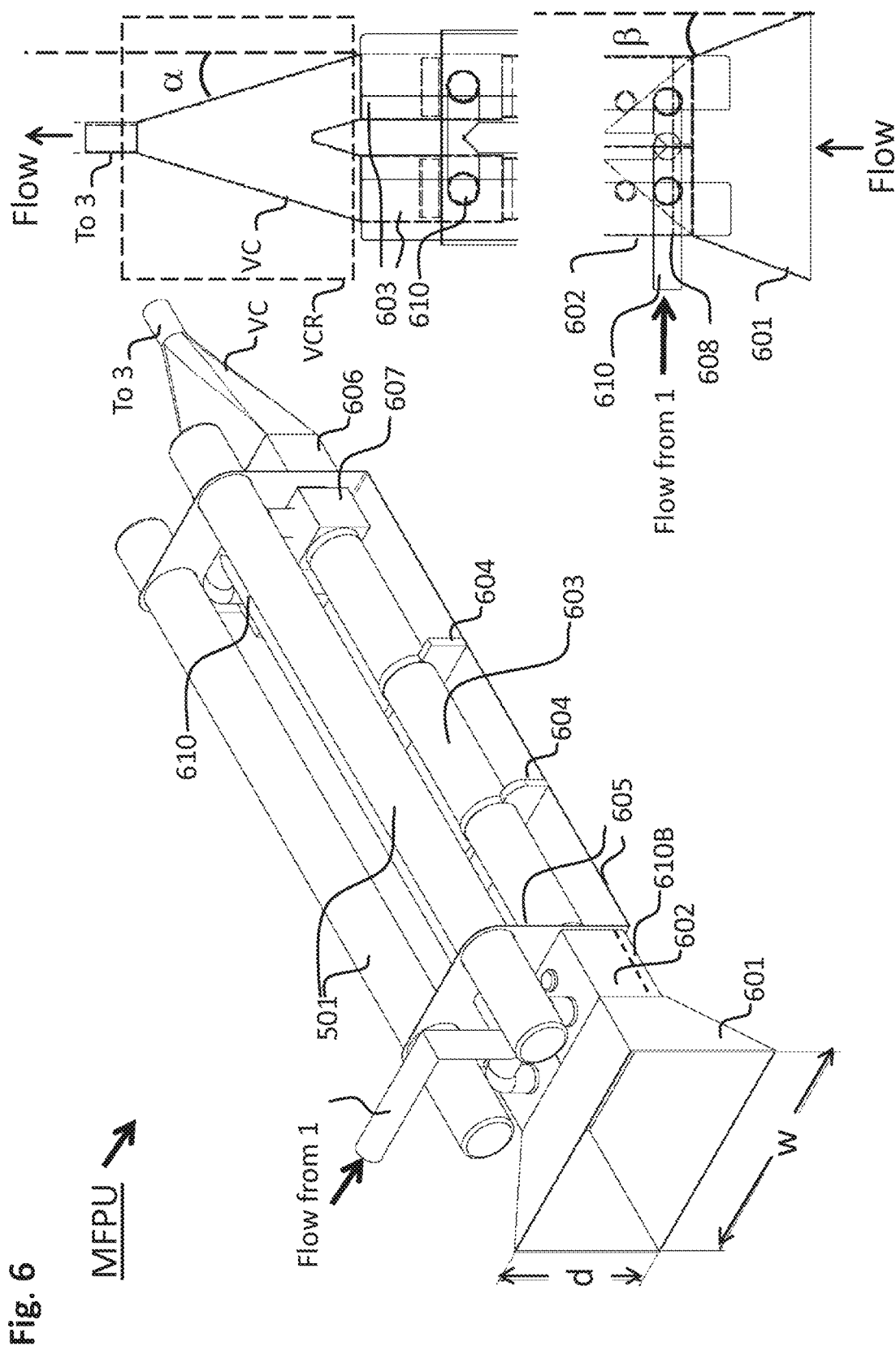
Figure 6A:
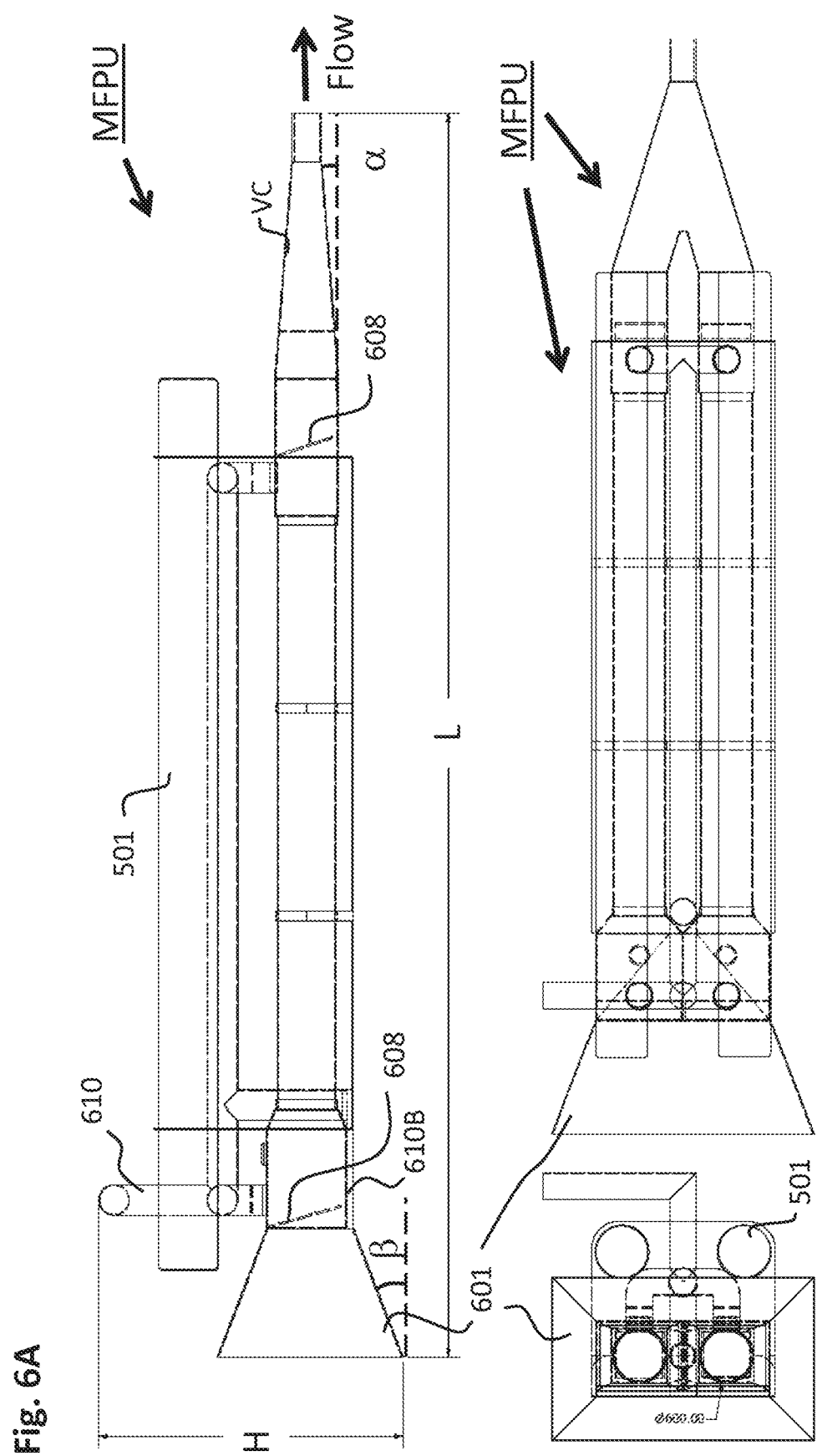
Figure 6C:
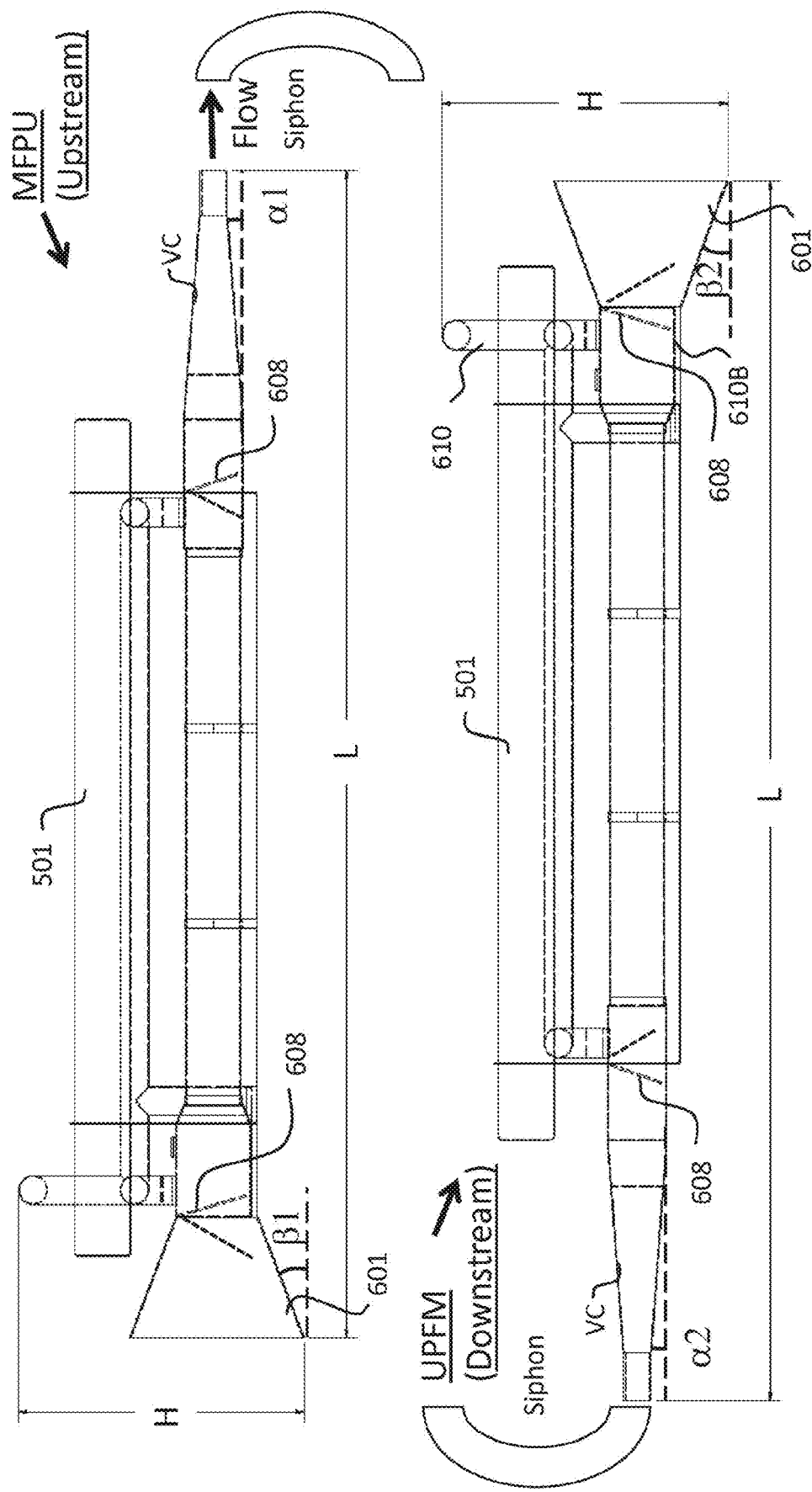
Figure 6D:
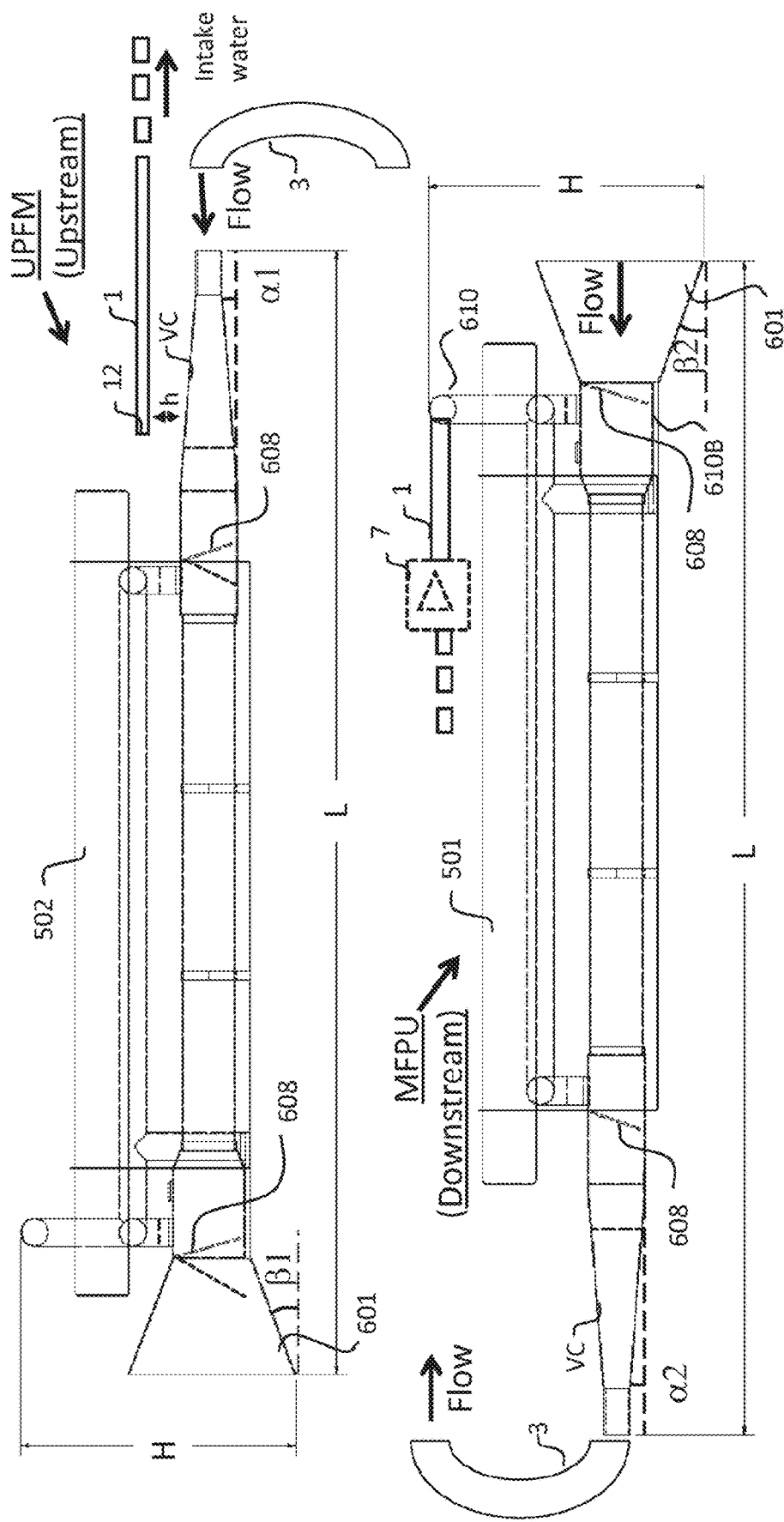
Figure 6F:
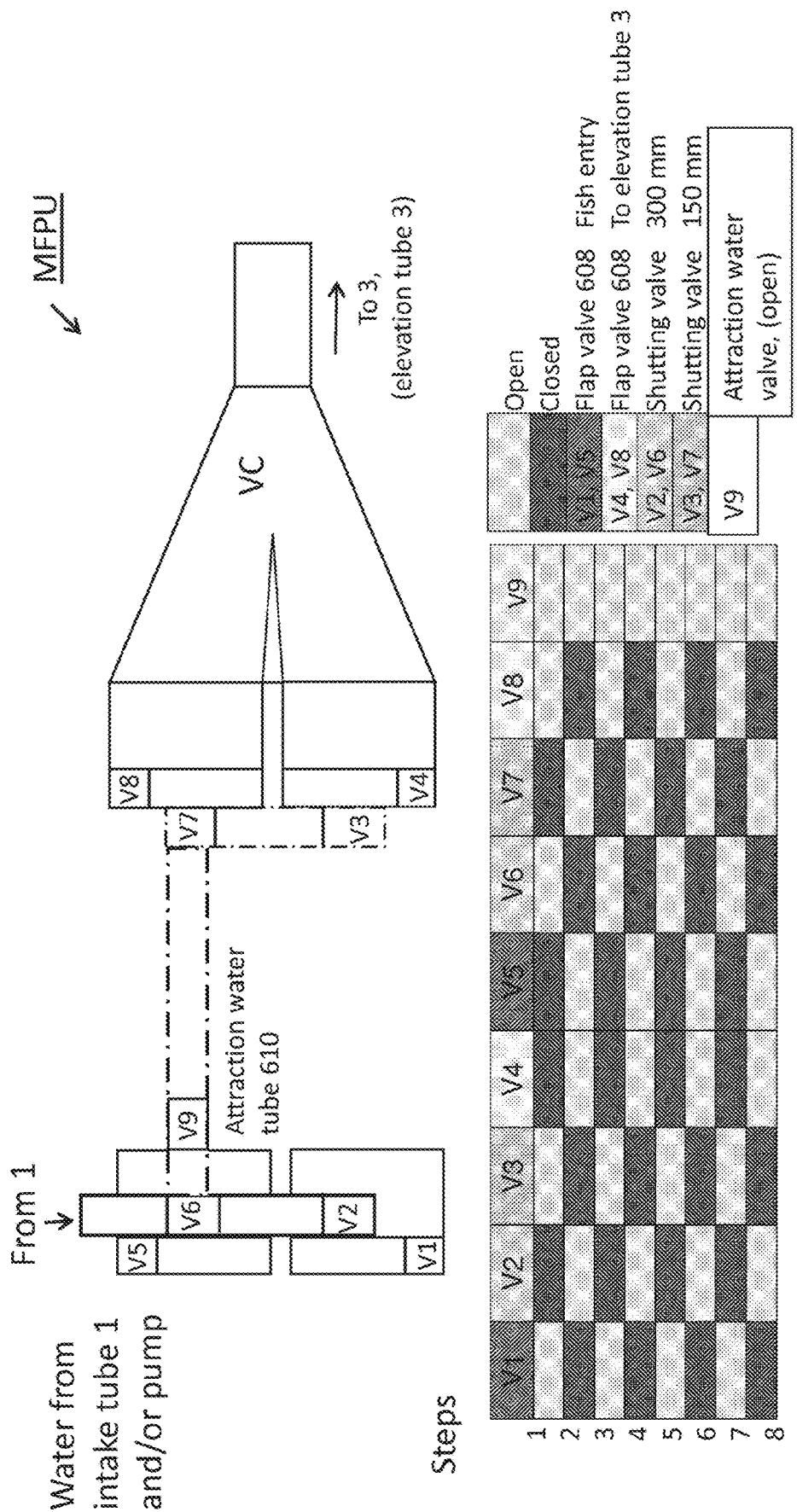
Figure 8:
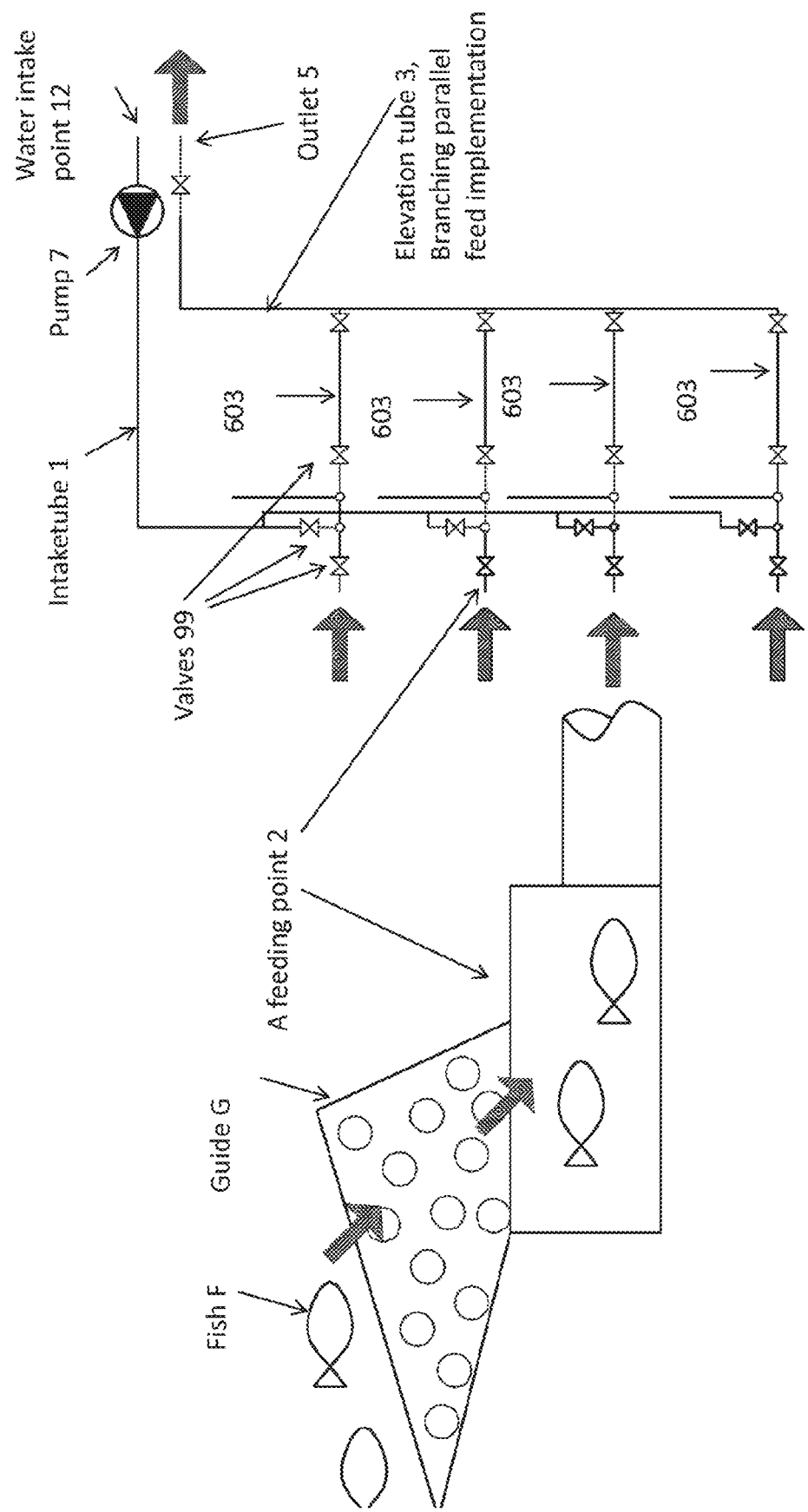
Figure 9:
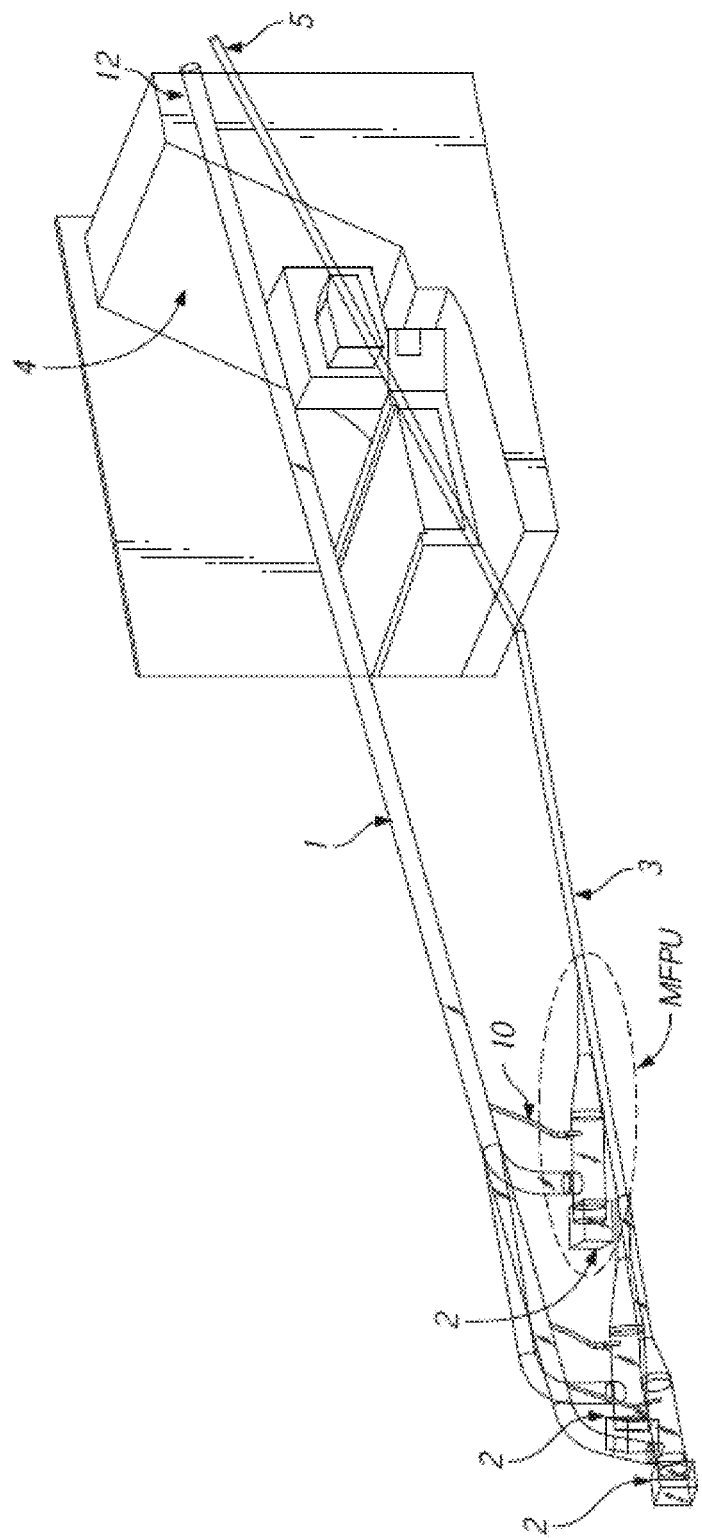
Figure 10:
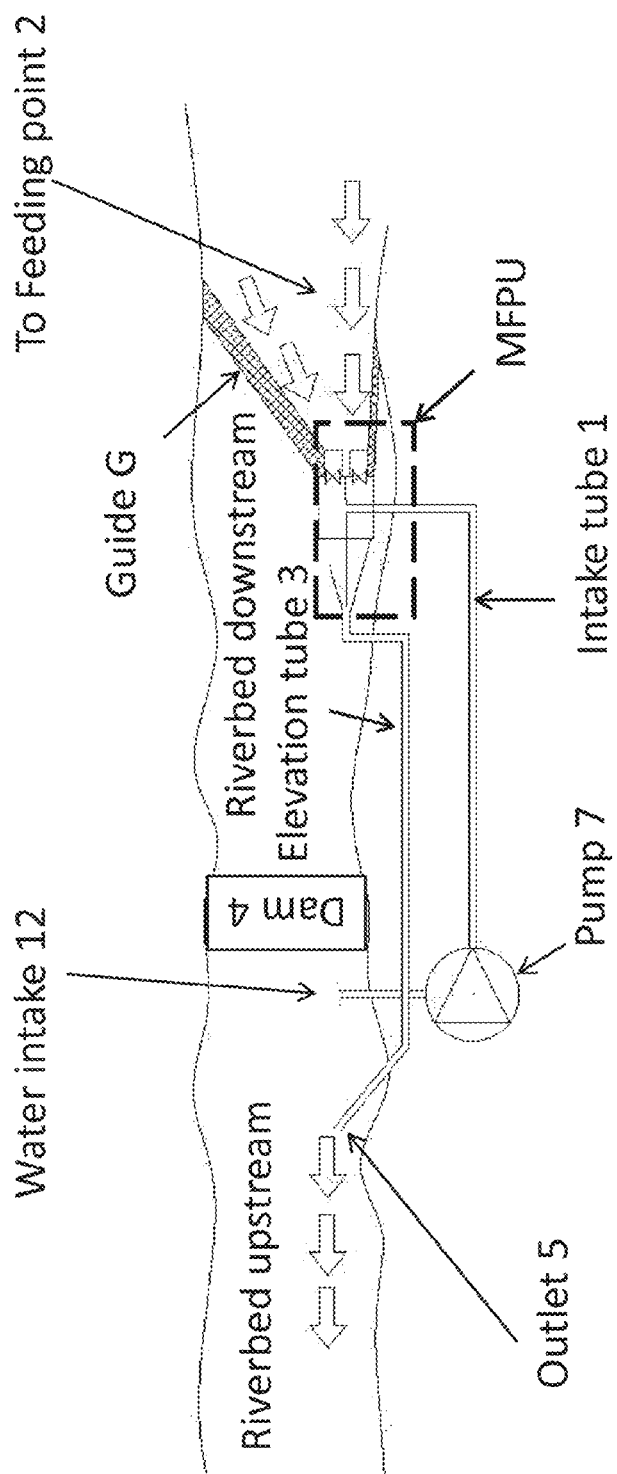
Figure 11:
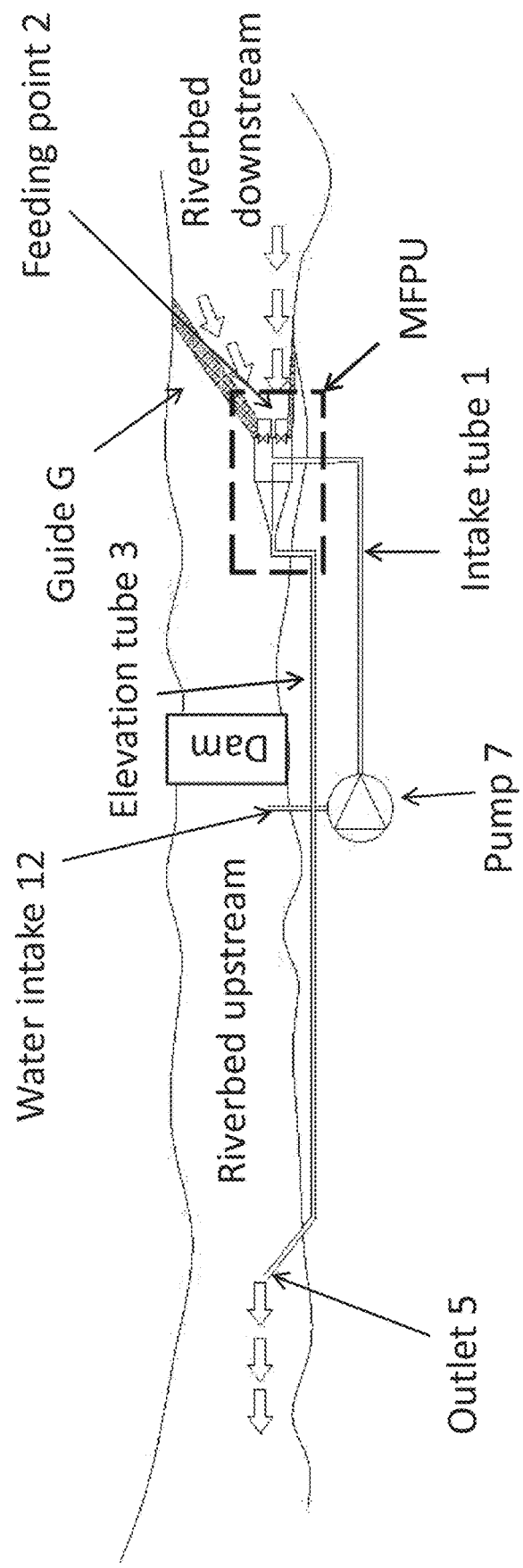
Figure 13:
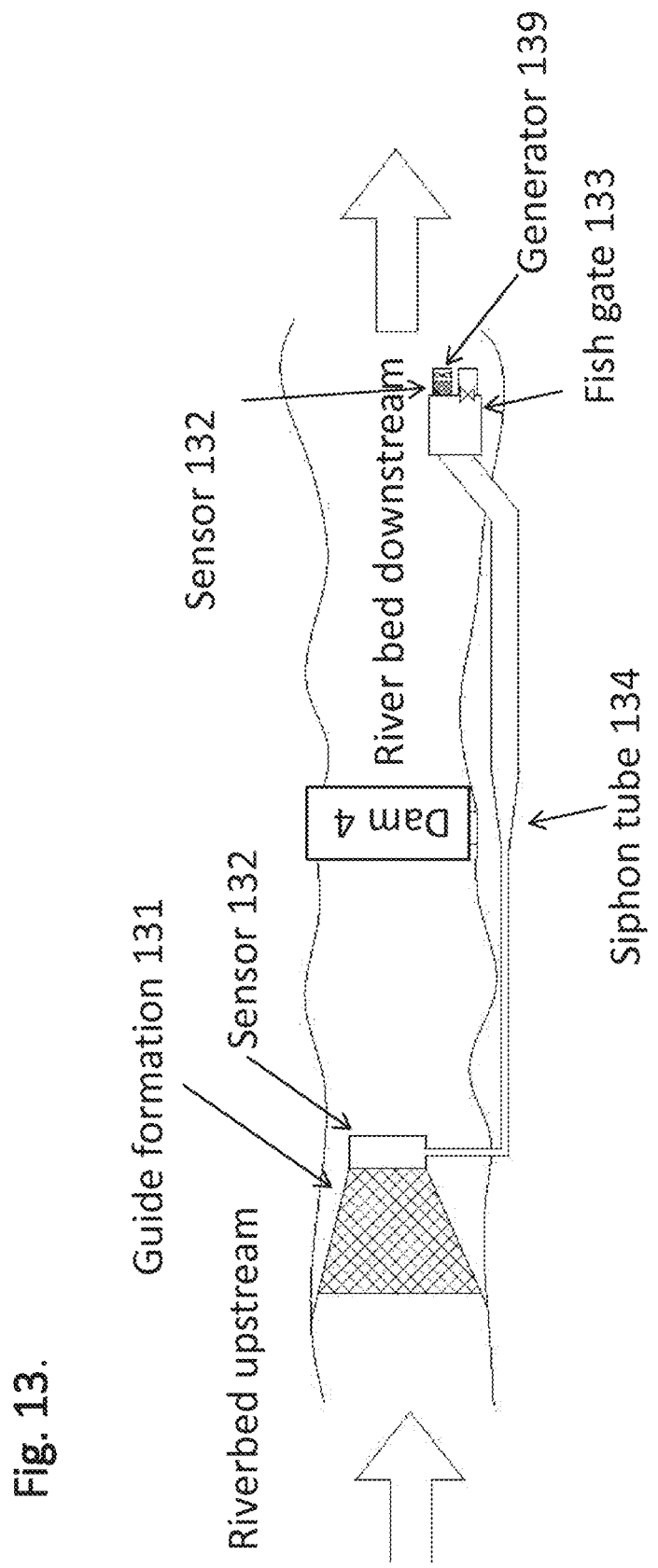

FIG. 1 illustrates an example of a fish ladder according to the known techniques, and in the following FIGS. 2-14, examples of the embodiments are illustrated and explained in a further detail, in which FIG. 2 illustrates an example of an illustrative embodiment of the invention about the hydraulic flow arrangement operation, FIG. 3 illustrates an operational scheme example of an embodied migratory fish passage, FIG. 4 illustrates an operational scheme example as a 3d illustration of a tubing topology according to an embodied arrangement of the invention, FIG. 5 illustrate mobile migratory fish passage, mobile MFPU example for a free flow at an outlet location, FIGS. 5A-5C illustrate embodied examples of system elements of an embodied system, FIG. 6 illustrates an example of an embodied migratory fish passage unit, MFPU as a system element with details, FIG. 6A illustrates an example of a detail of an embodied migratory fish passage unit, FIG. 6B illustrates an example of an embodied migratory fish passage unit as UPFM for use as a system element at upstream location for provisions of an outlet point and water intake, FIG. 6C illustrates an example of an embodied system by using migratory fish passage units, such as MFPU and UPFM as system elements, FIG. 6D illustrates an example of an embodied migratory fish passage system, FIG. 6E illustrates a control unit example according to an embodiment, FIG. 6F illustrates an example of valves assembly operation and a respective timing example, FIG. 7 illustrates an example about embodied anchoring of an MFPU (and/or UPFM) to the riverbed bottom or to a pool bottom, with an anchoring element as a system element, FIG. 8 illustrates an example of a scheme according to an embodiment of a migratory fish passage having several feeding points and collection points, each with ensemble of valves, FIG. 9 illustrates an example of an operational scheme as a 3-d illustration on an embodiment of the invention according to the arrangement example in FIG. 8, FIG. 10 illustrates an embodied outlet of the fish from the migratory fish passage as an example to exit the fish upstream at the outlet point near the dam, FIG. 11 illustrates an exemplary embodiment of the invention to exit fish from the migratory fish passage, to exit the fish upstream further away from the dam at a remote upstream outlet, FIGS. 12 and 13 illustrate embodied system parts, for use to constitute the return passage past the turbine, to avoid the turbine tunnel, from an upstream location to downstream location of the riverbed, respectively from a location near the dam (FIG. 12) and to a further remote location of the dam (13), and FIG. 14 illustrates an operational scheme example of an embodied system parts that form an embodied return passage for the fish along the fish passage, pass the turbine, as embodied with an upstream location situated sensor to sense the fish presence.

DETAILED DESCRIPTION OF THE EXAMPLES IN THE FIGS

Same reference numbers have been used in suitable part in different Figs, if not otherwise particularly pointed out. Within the same reference number, cited object of an embodiment of the invention does not necessarily need to be exactly identical to another similar object cited with same number. Instead, a skilled person in the art can observe the potential difference from the context in use between such embodiments, if any exists. The embodiments of the invention are combinable in suitable part.

FIG. 2 illustrates an embodied illustrative object 200 to illustrate an arrangement according to the embodiments of the invention, said object 200 being a passive illustrative object as a demo version device 200 of Migratory Fish Passage Unit, MFPU. The demo device 200 comprises the corresponding parts to and illustrative of a full scale arrangement as follows: intake tube 1, feeding point 2 to collect fish to be fed in their upstream migration via the elevation tube 3, elevation tube 3, dam 4, and an outlet point 5. The term "point" as such is referring in association with the feeding point 2 and outlet point 5 to the tube end parts of the embodied arrangement, wherein according to the embodiment at least a distance of a tube diameter define an area or volume that is considered to be near the tube end at the points. The illustrated intake tube 1 and elevation tube 3 are illustrating the migratory fish passage flows passing the dam 4 between the downstream 217A site and upstream site 217B of the riverbed.

The illustrative object 200 comprises an illustration of the embodiments with in addition to the illustrated tubes and the flowing directions therein the operation principle in a certain level by the small scale object 200, for example for illustrative purposes in business meetings.

FIG. 3 illustrates an example of an operation scheme on an embodied migratory fish passage implementation with an MFPU according to an embodiment of the invention. According to the illustrated example of the arrangement, the embodiment is using a pump 7 for assurance of compensation of the flow losses in the tubes.

According to an embodiment, the pump can be located according to corresponding embodiments to the dam 4, upstream or downstream of the dam 4, or to both locations to provide certain operational redundancy, and/or to get pumping power to very long lines in such embodiments with extremely long tubes (in which a single pump could be more expensive to mount than two smaller pumps). In the example of the embodiment, the pump 7 has been mounted at an upstream location, but can be situated at a location nearer to the branching location of feed a feeding tube of the attraction water 10, even in an embodiment near the end of the intake tube at a downstream location. One aspect according to the embodiment is that whether the pump 7 was more of a sucking type or pressure increase developing type. According to an embodiment both types can be provided for redundancy and diversity in operation, for securing the operation against breaking and/or mal-functioning.

The embodied ensemble of valves 99, that facilitates controlling flows in the elevation tube and intake tube in suitable part for the fish entries and/or the water flows. The valves 99 are further discussed later, the operation example of the valve assembly 99 is considered in FIG. 6D. At the near location of the elevation tube, the drawn valves can be opened, closed or set into a state between fully open and fully closed, to control the flow in the elevation tube 3 and/or intake tube 1 and/or the branches of the said tubes (1, 3).

The FIG. 3 is illustrative also such an embodiment that has a control device 301 for controlling the fish-catching for samples, but also for water and/or water composition samples, especially from the elevation tube 3 flow, or a flow measuring device.

According to an embodiment, the device 301 can be used to measure the flow for the flow control, or a suitable pump. The device 301 is illustrating also devices in water sampling, for a sample port 11, (c.f. FIG. 5C). With a suitably selected structure of the port, also a fish sample is possible to get, as illustrated at the upstream situated embodiment variant of the object 301.

In association with the FIG. 3 there is also an illustration of examples of channels and the tube thicknesses thereof according to the shown example, but the thickness being not limited only to the shown exemplified dimensions.

For example the elevation tube 3 has been scaled in the example by a 50 mm tube, but the intake tube 1 by a 200 mm tube (in diameter dimensions). Although either tube as such were drawn with constant diameter thickness between the feeding point 2 and outlet 5, it is not intended to limit the embodiments only to the mentioned exemplified values in the arrangement and/or MFPU, or only to the embodied constant diameter thickness. According to an embodiment, the attraction water feed 10 has been arranged in the example by a 50 mm tube in diameter, but the example is not limiting the embodiments only to the given exemplary embodiments.

Downstream site locations 217A with respect to the dam 4 have been also illustrated in FIG. 3, as well as upstream locations 217B. The natural water flow in the riverbed direction has been indicated by the tilt of the arrow lines, the arrow head demonstrating the respective direction upstream or downstream from the dam 4.

FIG. 4 shows an illustrative operational example of an embodied migratory fish passage arrangement at downstream location. In the FIG. 4 embodiment example the pump 7, which is not shown in the FIG. 4, were located upstream the dam, (cf. pump 7 and dam 4 in FIG. 3, for example), if used in such an embodiment the pump in the embodied location. However, although the pump was not shown, in such embodiments that were intended to use pump, according to an ensemble of embodiments the pump can be located into the dam 4, its vicinity or at an adjacent position, or downstream. According to the FIG. 3, the pump 7 can be embodied so that the suction side of the pump is at an upstream location and the pressurized side is at a downstream location of the intake tube 1. The water taking point 12, the intake point 12, is before the pump, upstream direction from the intake tube 1. Arrangement exemplified in the FIG. 3 can be used also in the FIG. 4 related embodiments to control the tubes and the tubing topology. A control unit can be used in the control of the valves and the flows.

FIG. 4 illustrates an operational scheme example as a demonstrative 3-d illustration of an arrangement according to an embodiment of the invention in which the feeding point is formed from a tube comprising two branches. According to an embodiment of the invention, the feeding point comprises two parts, but according a further ensemble of such embodiments the number of branches can be even higher. According to a further variant of an embodiment, the branches have each their own ends that are distant to each other but join to the elevation tube. The example does not limit the other embodiments only to the mentioned embodiment, but there can be a higher number of the branches of the tubes than two. According to an embodiment, also redundant elevation tubes can be used. According to an embodiment of the invention, two or more feeding points can be set to operate sequentially by their turn, to alter between the closed and open states to provide access for the fish to the corresponding elevation tube or branch thereof.

The ellipse with a dashed line in FIG. 4 is used to illustrate an embodiment of an MFPU in a downstream location.

According to an embodiment of the invention, the water intake point 12 in FIG. 3 has been set near to the surface, so that the outlet 5 is easier to put lower from the surface, to a deeper depth, for constituting a hydraulic pressure difference there between.

FIG. 5 illustrates a demonstration with equipment according to an embodiment of the invention, to show the water exiting from the outlet freely flowing out from the end of the elevation tube 3.

The equipment in FIG. 5 is embodied as a device that is similar to a large scale one that could be used in a solid mounting at a power plant dam as a migratory fish passage, but in FIG. 5 scaled down so it is mobile in a vehicle or a trailer as shown in the FIG. 5. This embodiment facilitates the mobile migratory fish passage to be used in a small fish plantation or transport locally according to the needs and the acute situation. Mobile migratory fish passage can be embodies as illustrated in FIG. 3 in suitable part, but the tubes can be made of bendable and elastic material where appropriate. The mutual position of feeding point, water intake point and outlet point relative to each other is dependent on whether the mobile device is at an upstream location or downstream location. If needed, a pump can be used, so as to provide the flows, and/or boosting flows, according to the scheme of FIG. 3. FIG. 5 also demonstrates in suitable part a version of a mobile embodiment of the system part of the passage pass a turbine, to be used in the fish plantation.

Referring to FIGS. 5A and 5B, according to an embodiment of the invention, at least one of the water intake points 12 and/or outlet 5 has been arranged in association with a floating buoy or a pontoon, so as to implement strict following of the water level at the corresponding location, without a danger of that at the water intake location 12 the intake tube 1 end would be left above the water surface when the water level was dropping. In a corresponding way, it is also possible at the feeding point 2 to arrange it floating by a buoy or a pontoon 501 at a downstream location. Such examples of embodiments are illustrated in the FIGS. 5A and/or 5B.

In FIG. 5A example, the embodied water intake point 12 at the tube end has been arranged to float by attaching the water intake point 12 to a pontoon 502, but the tube end underneath the water level surface. According to another embodiment, the outlet 5 tube end has been arranged to float by attaching it to a pontoon underneath the water surface to such a depth. According to an embodiment of the invention, the intake point 12 tube end has been attached to the same pontoon as the outlet 5 tube end, but arranged attached to a constant mutual vertical distance h from each other, to ensure the pressure difference there between. The vertical distance may be also implemented by locating the tube ends 5 and 12 apart from each other as floating in the water in the riverbed, the tube end 12 being situated further upstream, the location dependent on the riverbed elevation for gaining effectively the vertical distance h.

Although MFPU has been indicated as an embodiment variant at the downstream location from the dam 4, according to a further embodiment of the invention, another MFPU can be used upstream to provide the unit holding the tube end 5 and/or tube end 12 at its location. In such embodiment the tube connections at an upstream location may be altered in respect to the tube connections at downstream location, so that the water flows are reversed in suitable part. A skilled person in the art can make the connections for that embodiment, when read and understood the embodiments of the invention. In FIGS. 5A and/or 5B to 5 and from 2 illustrates the elevation tube 3 from downstream location to upstream location, according to an example of FIG. 3 for example.

In FIG. 5B example according to an embodiment of the invention, the pontoon 502 and/or pontoon 501 have/has been arranged to be anchored respectively to a specific pontoon pool 504, 503 to keep the tube ends 5, 12 and/or tube 2 end (at location associated to 503) under the water surface. According to an embodiment, the pontoon pools 503 and/or 504 have been sunk into the riverbed RBB so that even if the river were drained almost completely, down to the depth in which an average river system migratory fish would still be able to swim, the pontoons 501 and/or 502 can still float despite very shallow waters in the river in the pontoon specific pontoon pool as attached, and maintain the fish migratory operation. According to an embodiment, the pontoon pool can also prevent the pontoon or buoy from drifting along the stream or winds.

According to an optional embodiment the attachment of an MFPU can be also embodied by an anchoring piece attached to the pontoon, as shown in the example of FIG. 7, the anchoring piece being mounted into the pool in such river systems that drain heavily, but optionally to the riverbed bottom without the pool in such river systems that do not drain that much a pool is needed during the season when the migratory fish migrate and spawn. The schematic FIG. 7 illustrates, that the size of the attachment interface can be also quite large, but it is not limiting the size only to the shown dimensions ratios, rather the anchoring as such can be made in many ways to keep the pontoons at a desired location, also as by embodied by wires.

The pontoon pool can be equipped with suitable shallow nets and/or labyrinths to prevent the entry of floating garbage, although it might be clear that such a pool might need to be cleaned of trash and mud sunken into the pool.

In a corresponding manner, the downstream location the pontoon 501 can be attached by the pontoon pool 503. The pontoon 501 can be a pontoon of MFPU. The symbol UPFM has been used to illustrate such an embodiment variant of MFPU where the MFPU has been reversed in respect of the flow direction (as illustrated by the abbreviation reversal UPFM) and, here, the tubes connected accordingly at an upstream location to provide the operation of the arrangement. Thus the pontoon 502 can be a pontoon of a reversed connected MFPU, UPFM. Then the feeding point 2 tube end can be secured to a reasonable water level underneath the surface, and the migratory fish could enter into the migratory fish passage in the dried conditions even if the variations of the water level were large. According to an embodiment of the invention, the pontoon 502 can be a pontoon of an UPFM, although not marked as such in the FIG. 5A.

Integration has been illustrated, as an optional embodiment as such, in FIG. 5A by the dashed line to illustrate applicable parts inside the line in suitable part from the migratory fish passage piping.

According to an embodiment of the invention, at least one of the following is integrated: Tube end at the feeding point 2, tube end at the outlet 5 and tube end at the water intake point 12 has been integrated to a part of the pontoon so that the downstream feeding point 2 pontoon 501 is separate from the upstream pontoon 502 as such, although are connected/connectable by a tube and the valves to an upstream pontoon or alike as cited, according to an embodiment variant. The reference numeral 4 illustrates the dam.

In FIGS. 5A and 5B the cited parts 501, 502, 503 ja 504 are according to an embodiment of the invention system elements of a system formed by using a flow arrangement according to an embodiment of the invention. Reference is also made to the FIGS. 6 to 6F, for the embodied MFPUs and/or UPFMs as such a part of an embodied arrangement and/or in use as system elements.

According to an embodiment variant of the invention, the water intake point 12 at the tube end has been attached to its own buoy or a pontoon, which is anchored to the riverbed bottom RBB, and/or to a bottom of a pool (503, 504) in suitable part, for example.

A skilled person in the field knows from the embodiments that such a pontoon can be anchored to the position also from the above surface parts in suitable part to suitable constructions. The water transport tubes of embodied system elements can be provided in suitable part in an embodiment with elastic parts, for the implementation of the attachment to the buoy or pontoon, for the operational aspects, so that the water intake point can follow the water surface level at the site upstream and/or downstream of the dam 4 because of the elastic parts and/or bending material in suitable part. In a similar way, the fish exit point 5, the outlet 5, can be equipped with a buoy or a pontoon to a lower position than the water intake point 12, for maintaining the hydraulic pressure difference, despite water level variations. According to an embodiment, the water intake point 12 and the outlet 5 are arranged to a same buoy or pontoon, but to different levels so that the water intake 12 is nearer surface than the outlet 5 (by a distance h as in FIG. 5A). The pontoon or the buoy can be embodied according to the invention by a pontoon of MFPU, and/or UPFM.

By the intake tube 1, the water is brought to the feeding point 2 position, also in an embodiment via a tube 610 to the part 602, for example, from where the fish are fed into the elevation tube 3 leading tube 603, via the ejector formation suction at the feeding point, the fish to be transported in the elevation tube 3 flow from the downstream waters passing the dam to the upstream waters and out of the elevation tube 3 at the outlet 5. According to an embodiment of the invention, the water intake point has been protected so that the fish cannot access it, if not safe for the fish, especially when the migration season is ongoing so that the fish are supposed to migrate upstream. The protection can be removable, if the tubes are intended to be used as a return passage for the returning fish, as fish passage past the turbine.

According to an embodiment, the intake tube can be utilized during the return season of the fish, as returning from the spawning sites, the tube can be used as a passage past the turbine tunnels. In such an embodiment, the fish can be guided, by suitable valves in a valve ensemble 99, out of the tube, leading from the upstream location to the downstream location. Valves can be used to control the water amount that passes the dam, for minimizing the water losses. This can be achieved with controlling an ensemble of valves 99 according to their timing to allow fish passing the appropriate valves 99.

Garbage or other foreign objects that could fit into the tubes but would most probably cause clogging can be filtered out of the waters that access the arrangement from the water intake point 12. The valves of the ensemble 99 can control what potential branches are active in operation, in such embodiments in which there is an ensemble of implementations to intake tube 1 and/or elevation tube 3, to be operated in parallel parts of the migratory fish passage. It is also possible to arrange the attraction water feed 10 from the intake tube 1 for attracting the migratory fish to the feeding point 2, so that the instincts of the fish could guide the fish to the desired upstream passage.

According to an embodiment variant, the sampling port 11, as the location exemplified to upstream location (without intention to limit the sampling port only to the location shown in the example) has a counter to count the number of fish travelling in the elevation tube. The sampling or fish counting is considered also in the example embodied in FIG. 5C. According to an embodiment variant, the fish counting is based on optical signal, for example to a light beam, from a light source, the passing fish cut the light beam, the pulse so formed being indicative of its length to be determined, and consequently the size and the number estimate to the fish, when the flow and the fish velocity can be estimated sufficiently accurately as based on the optical signal, to be transformed in suitable location to electrical signal in a transforming interface and to be processed further in electrical form. The number and/or size and/or species of the fish can be stored into a database, locally and/or or via Internet or another communications network. The signal from the counter, camera and/or an imaging apparatus, and/or a part of such, can be used to make a control signal, for example. The counting can be optionally in suitable part be based on acoustic echo of the fish or a part thereof.

According to an embodiment also a camera can be used so that a background set scale, and/or a virtual scale of an image processing device, are in use for reliably estimating the fish size in the fish passage of the elevation tube 3. During the fish counting, the detector that is used to detect the fish, because of a presence of a shadowing fish (i.e. large to cover the view to other fish potentially at the same time in the tube 3) at the sampling port for the counting, it may be not detecting other fish as such, but if able to detect potential other fish, so according to an embodiment of the invention that were based on a pulse counting application, there may be a need for a dead time correction when a dense shoal of fish occurs at the detection location, passing the detector device.

According to an embodiment variant, the camera can be combined via an ordinary counting automation of known type as such, according to a variant embodiment also to the internet, so facilitating the study of the fish not only locally at the site, but also by remotely situated researchers, being able to use the data obtained via the sampling port. The mounting may be made to use an exchangeable/openable suitable flange, and a water-lock that may be used, so to facilitate also a fish-catching for the measuring individual fish so caught, and/or returning back.

By selecting the light source as a system element to an optical counting device in a suitable way, for example laser-light or optionally white light source, it is possible to make absorption measurements of spectrometry as such with non-invasive optical methods if spectrometer apparatus for the optical signal forms and/or the components are in use for the fish and/or the water and/or its composition studies.

According to an embodiment of the invention, the valves 99 comprise an ensemble of valves comprising a closing valve that can be as such even a mechanical part, but according to an embodiment variant it has an electronic part that is controllable according to electric control signals, to provide a flow mechanical action of at least a valve of the valves assembly 99 to the through flowing flow, when said valve is in operation. According to an embodiment the control signal is a digital signal, according to an alternative embodiment the control signal is an analog signal. According to an embodiment signal can be in optical form to be passed to an interface to transform the signal to electrical form. Leading signal in optical form may be preferred to electrical at locations where there is presence of strong magnetic fields, for example. According to an embodiment of the invention, the control signal transmitting device, transmitter, and the receiver part of the control signal apparatus are operable compatibly with respect to the signal type being digital or analogue. According to an embodiment, a wired signal communication is preferred in long-distance underwater conditions because of the radio wave propagation properties in the water, if optical signal is not able to propagate in the waters to sufficiently long distances.

Referring also to the FIGS. 3 and/or 5C, the sampling point 11, that can be embodied at the elevation tube 3, before the outlet 5, can be routed even through a power plant laboratory so that the fish in the elevation tube 3 can be photographed and/or filmed, but also the size and the species estimated by non-invasive methods, with provision that there is a transparent part, a window, in the tube for the optical facilities for that. Such a sampling point 11 can be equipped with a counter to count the fish. The tubular structure of the migratory fish passage system provides this facility for the embodiments, with a promoted accuracy for the analysis to be made. A skilled person knows from the embodiments of the invention that measurement data so obtained can be sent as electronic signals via internet or local net to the other parties interested in the fish data to be analyzed and stored in suitable part to the extent necessary.

According to an embodiment, the detection can be used for constituting a control signal which is dependent on the fish amount in the tube, but also a delayed signal for port control in accordance with the fish locations. Thus, the fish can be photographed, but also, if the fish had an individual tracer, such may be also visible in suitable conditions so that the tracer could be recognized, but if the tracer was actively collecting information, such information could be downloaded at the sampling site 11. The fish can be also videotaped. It is also possible according to an embodiment variant to classify the fish according to their size to suitably sized tubes, so that the counting statistics can be made of fish of a certain size, consequently more reliably, as based in suitable part on pattern recognition. It is also possible to make a latent time correction in the fish number estimation, if the fish are numerous at the counting site, the counting based on pulse counting and/or pulse duration.

The sampling point 11 (or points) can also be used to monitor the water composition, by the water samples in a suitable embodiment in which there is a suitable valve for taking the water sample. In such a case, the water's oxygen content, for example, can be studied, and/or other gases, water borne substances or soluble species, even trace levels of the substances, species and/or bacteria, or other microbes from the samples.

The oxygen content can be used as an indicator of the fish number in the tube, that are simultaneously in the tube, or the indicator so formed can be used as input to a control device and/or to constitute a control signal to increase the oxygen content according to the fish number. This can be effectively gained also by increasing the flow rate by the pump 7, so lowering the average delay in the tube for a fish, but also by pumping air or directly oxygen into the waters for the fish in the tube. In an ensemble of elevation tubes, provided each elevation tube with an embodied sampling port, it is possible to measure and/or adjust the operation parameters according to the fish in the elevation tube tube-specific manner.

According to an embodiment of the invention, the resulting oxygen concentration and the dependent sensor signal can be used to control a pump 7, and/or to close or open valves near the feeding point in order to control the flow rate in the elevation tube. The control signal can be based optionally on or in addition also to a carbon dioxide concentration. The sensor could be an optical sensor, applying in suitable part spectroscopic methods to measure absorption and/or emission spectra.

By using an opacity meter, it is also possible to monitor the opacity of the water so as to estimate the water-borne particulate matter. Thus, the opacity meter signal can be used to constitute a control signal for adding in suitable part clean water to the system for the fish. According to a variant of the embodied system, a measurement signal indicative of oxygen concentration, particulate matter and/or carbon dioxide concentration can be used as an initiation signal to activate as a response a device to increase air or oxygen production into the water when a signal drop below a threshold has been observed. Optical windows at the sampling site also facilitate spectroscopic measurements to obtain data about the water carrying substances via emission and/or absorption spectroscopy as such, to monitor the composition of the water and the constituents in it. Thus the measurements can be based on elastic or inelastic scattering and/or transmission analysis of the medium. Light is such an optical range electromagnetic radiation that penetrates the water and/or translates in it a macroscopically determinable distance, the nature of the application considered, at least several centimeters from the sampling point waters to the detector of the detecting apparatus.

FIG. 6 illustrates an example on an embodiment of the invention directed to a migratory fish passage unit MFPU.

According to an embodiment of the invention, the migratory fish passage arrangement can be implemented by a migratory fish passage unit, MFPU as shown as an embodied example in FIG. 6. The FIG. 6 shows the MFPU, "a fish shuttle", which comprises at least one pontoon 501, although there is two drawn in the example. The number, size, shape or dimensions of the pontoons 501 is/are not limited to the shown example, provided that the unit is able to float on water surface with the pontoons and the feeding point providing cone 601 (a the tube 603 positioned valve with Flap in an embodiment) being at least partly underneath the surface so that the fish can swim into it. The dimensions of the cone are illustrated by the letters d for height, and w for width. These dimensions can be in scale in the example, but it is not necessary for such embodiments that use different dimensions, aspect ratios and/or number of to the elevation tube 3 leading tubes 603. A detail at the down right, the cone is illustrated with a wall angle $\beta$ to the accessing flow direction, the latter demonstrated by the arrow, also at the exit side detail on right corner, illustrating also the flow entry, to be directed to the elevation tube 3 by the label "To 3". The FIG. 6 embodies also two tubes 603, both leading water from the cone 601 to the exit of the MFPU's To 3 exit point for the flow exit from the MFPU to the elevation tube 3, leading the flow therein to the outlet 5 (cf. FIGS. 5A, 5B and 3), as the schematic example in the FIGS. 5A and 5B illustrates for the system. The tubes 603 are arranged to take water from the cone according to valves, that are positioned with their flaps 608 to the interface part 602, that also provides attraction water from an intake tube (not shown), for example to lead the water to the tube from the flow of intake tube 1, the tube being arranged for further branching the flow according to the tube branches and corresponding valves to control the branched flows, but also to provide the operative flow for the ejection of the water into the tube 603 from the cone 601 and further on, for leading the fish in the elevation tube 3 flow upstream located outlet 5 (FIG. 3), in the flowing water. The valves of an ensemble of valves 99 has been explained more in association to FIG. 6F.

The attraction water can be delivered by an ensemble of valves that doses the amount of the attraction water. This is indicated by the detail in FIG. 6F, in synergy to the detail on right, by the flap position to divide the projection of the vertical tube branches of the tube 610. At left the dashed line at the 610B is indicative of a flat channel ceiling under the interface 602, so that the channel 610B is arranged to deliver attraction water to the cone 601, so intensifying the attraction water effect to a fish, for its entry to the cone 601. The interface 602 can comprise in the embodiment example two valves inside, to be operated each for its own tube 603, in accordance of the fish presence and/or the scheme embodied in FIG. 6F.

According to an embodiment of the example, the valves may be operated by a fish gate sensor control signal bound, and/or according to a timing scheme. According to an embodiment the valves can be operated according to a timing scheme, for example such as that in FIG. 6F, for the valves V2 and V6. The attraction water can be dosed by an ensemble of special valves to control the attraction water distribution of the MFPU. The use of these valves spares water, so that it is not necessary to flood continuously water passing the dam. At the other end of the MFPU, there is the valve chassis 607 operating similar way as an interface as the interface 602. There are also valves to control the fish access to the Vena Contracta Regime VCR, as exemplary embodied in FIG. 6F, where the flow of the intake tube via the tubes 603 continues via the interface 607. It is also possible according to an embodiment to boost the flow by providing an ejecting effect by additional water via the tube 610, to the location of the item 607, so that the water in the tube 603 (and the fish at the corresponding fish gate valve) can access to the VC and via it to elevation tube 3 in the flow thereto. The Vena Contracta Regime is an illustrative reference to the area where the flow is choked by the Vena Contracta piece VC that makes the flow formations from the MFPU to the tube geometry of the elevation tube 3.

The contraction angle, considered also as an acceleration angle α is illustrated at the detail right upper corner. The piece 606 is a connection interface to connect the flows from the tubes 603 to the VC-piece from the part 606. The ejector operation in suitable embodiments can be embodied in suitable part in the part 607, but the part 606 can be using formations of the ejector exit to lead the flow to the VC regime, the flow being accelerated in the VC for the flow entry to the elevation tube 3.

The part 605 is illustrative a chassis of the MFPU, with the supports to the pontoons 501, and the supports 604 to the tubes 603. The examples embodied for the supports do not limit the scope of embodiments only to the shown structure example or number of supports.

The dashed line 610B is indicative of a shallow channel for secondary attraction water line in a separated channel from the 602 interface, and/or the valves therein.

According to an embodiment of the invention the intake tube 1 can feed the tube 610 in suitable part. However, according to an embodiment variant, the attraction water to the channel 610B can be provided with a separate line from an upstream location in respect to the dam. According to a further variant such a separate attraction water line can be provided with a pump, according to an even further variant by a pressure pump, so that the delivery is fast to provide the attraction water as authentic as reasonably possible. According to an embodiment the VC-regime VCR is symmetric so that the angle α is same in vertical direction contraction as in horizontal direction contraction (horizontal direction in the FIG. 6 example shown).

Although some of the parts in FIG. 6 are shown as in rectangular geometry embodied, a skilled person in the art knows from the embodiments that rectangular geometry embodied parts of the MFPU can be also implemented in other geometries without leaving the scope of the shown embodiments. The feeding point 2 can be embodied at the flap valve 608 as an example of an embodiment.

FIG. 6A illustrates an embodied MFPU from different views, from a side, at the top of the page, which is also an illustration of a single tube unit embodiment of MFPU from side. The flap valves 608 are opening to the flow direction, to pivot right, the down edge upwards. The example has a height H and the length L marked, according to an example, these respective dimensions are about 3 m and 12 m. The dimensions are not necessary in scale, but are not intended to limit the scope for the embodiments. At the left down, the view appears as it were seen from a position of an entering fish at downstream location from the dam, the fish being about to enter the cone 601.

In FIG. 6B illustrates an upstream location positioned UPFM unit, so that such is used as providing a floating outlet location for the fish. The extra tubings (in respect to the UPFM unit) are indicated in the illustration for the water intake. Synergic reference is also made to the embodiments illustrates in FIGS. 5A and 5B. The flap valves, if used in the embodiment, open to the flow direction by a pivot around a hinge at the upper edge of the flap.

FIG. 6C is illustrative a fish passage past the turbine, in which there is utilized MFPUs for providing the fish access end at an upstream location in respect to the dam, and another MFPU for providing the fish exit end at an downstream location in respect to the dam. There between the access location and exit locations there is a connecting siphon tube, as schematically indicated in FIGS. 12 and 13. The valves can be operated according to the sensors as embodied in association of the FIGS. 12 and/or 13 in suitable part, but also as illustrated in FIG. 6F in an applicable part, for the fish entry. It is also possible to shut down suitable valves, if an MFPU (or an UPFM) with such were intended to use, the unwanted flows that relate to the attraction water, as the siphon tube that is a downstream leading tube.

According to an embodiment an MFPU can be also connected downstream location and upstream location by a siphon tube there between, the arrangement so providing a fish passage past the turbine arrangement. An MFPU can be also embodied as such at a downstream location, but the flap valves 608 being set to open to the flow direction, for the fish passage downstream of the tube flow in question, even so that the inside tube defined downstream direction can be opposite to the riverbed defined downstream, especially for the elevation tube, in use as an elevation tube, feeding or using flows. Such an MFPU is denoted as an UPFM where the flow direction is reverse in respect to an MFPU, as to demonstrate the fish passage being reversed to an MFPU system element.

According to an embodiment provided with such valves that take the intake tube flow to be used as the siphon tube flow, it is possible to cope with one MFPU and one UPFM for the system operation to both ways. However, a system can be also embodied with dedicated MFPUs and UPFMs for both directions of the fish migration. Use of MFPUs and/or UPFMs in suitable part at suitable locations, provide a simple way to follow the water surface level.

In FIG. 6C it is illustrated an embodiment in which the flap valves 608 of the UPFM unit can pivot to the opposite direction at the downstream location to that at an upstream location positioned MFPU-unit's flap valves. But however, to the flow direction in the tube. The operation can be controlled according to the presence sensor to sense the fish entry. The intake tube can be used as the siphon tube, but an elevation tube that is not illustrated in the FIG. 6C may be needed, if the passage for the fish is embodied from a downstream location to upstream location. Also the flap valve operations should be provided as illustrated in FIG. 6A for the downstream entry of the fish for their upstream migration.

According to an embodiment variant the angle α need not to be exactly the same for MFPU and UPFM, but can be chosen as discussed in a later example. This is illustrated by embodied examples of the α as a first angle α, α1 and a second angle α, α2, which can be different for the optimized flow in respect of smallest losses at the respective dedicated site in an embodiment variant.

According to an embodiment variant the angle β need not to be exactly the same for MFPU and UPFM, but can be chosen as discussed in a later example. This is illustrated by embodied examples of the β as a first angle β, β1 and a second angle β, β2, which can be different for the optimized flow in respect of smallest losses at the dedicated site in an embodiment variant.

As also illustrated in FIG. 6D for the shown embodiment examples, in such embodiments that use a pump 7 for the intake tube 1 water production downstream, the siphon tube can be used both directions, thus as indicated as an elevation tube 3, especially if there is only one season for the upstream migration, or if there are not many species that have different upstream migration seasons. The pump 7 has been illustrated by dashed line, indicative of optionality at the location to deliver the intake water through the intake tube 1.

According to an embodiment variant, to use the siphon tube as an elevation tube 3, the intake tube 1 water intake location 12 can be selected suitably to a level that is under water surface. The Cone 601 does not necessarily have to be completely under the water surface at an upstream location. If pump used in an embodiment, for example to mitigate the pump load to reverse the siphon tube flow direction, to the accordance of the fish migration direction before or after the spawning, the water level h for the intake point 12 can be chosen accordingly. The underneath level of the intake location 12 is demonstrated by the way of drawing to draw the tube 1 below the pontoon 502 at the upstream location in FIG. 6D. The pontoons 501 and 502 can be selected in suitable part for the prevailing conditions at the downstream and upstream locations to float the corresponding system element, in many cases the difference there between the pontoons 501 and 502 relates to the location, the structure being in most cases the same, with the provision that the rest of the system elements MFPU and UPFM in question are sufficiently similar to be floating. According to an embodiment variant, at least one pontoon of the system is provided with a system that can adjust the pontoon floating depth. This can be achieved by providing the pontoon with a valve to allow water entrance, but to have also the rising action, with a pressurized air system for example to blow the water out of the pontoon.

FIG. 6E is illustrating an ensemble of embodiments how to control the migratory fish passage system in suitable part by such a control unit or center that is arranged to control the system element operations. The Control unit in FIG. 6E comprises means for reading the sensor signals 630, such as for to detect the fish presence. The control unit can also comprise means 631 to measure physical properties of the water, such as temperature at upstream and/or downstream location, the composition of the water in the tube, especially the oxygen and/or carbon dioxide content. A spectrometer, when/if used, can be integrated in suitable part or be embodied with an external structure. The control unit can also comprise a timer 632 to measure and/or set delays for valve closings and openings, for example. Also ensemble of valves as the valve ensemble 99 can be controlled in suitable part accordingly. According to an embodiment the control unit can comprise also means to adjust pump operation, flows, the pressures in the tube via hydraulic pumping, 633 etc. According to an embodiment the control unit can comprise a micro-processor 634 µP, memory 635, ADC interfacing means 636 (Also operations of DAC where applicable) to transform signals between digital and/or analog forms, especially in relation to the measurement data collection, but also to make a control signal to the pumps and/or valves according their type and need for the form for correct operation. The control unit can also comprise means 637 to operate sampling point valves and/or a water lock if used in an embodiment.

According to an embodiment the control unit can comprise means for self-checking and alarming 638, if system sensors are indicative a mal-function, (if for example a sawyer broke a tube causing a pressure loss, etc.). The control comprises also a data base 639 and memory 640 to collect data for the micro-processor operations in data analysis and/or signal processing, but also for communication to the external parties, for example via Internet. The communication means 641 can be wired, wireless or optical, in suitable part to follow a suitable communication protocol of a communications network as such. The control unit can comprise also means 642 for control the lights, especially at the sampling point, but also if tubes are provided with lighting, or similar location with a counter 643 to count and/or measure fish. According to an embodiment the control unit can comprise also a camera driver 644 for controlling the still pictures and/or video. The box 645 illustrates infra structure means for controlling providing the electricity and/or pressures for operations of the system elements, but also different relays and valves to be operated for supporting the infrastructure. According to an embodiment, the controlling as such can be implemented by a computer program run in a suitable microprocessor, but the system can also comprise electromechanical interfacing devices to connect the control to the desired targeted system element or a part thereof. According to an embodiment the control unit can be implemented in many ways, from a self-sustaining system unit to a power plant computer system embedded system unit, the implementation as such being clear to skilled person in the art, when read and understood the embodiments. According to an embodiment the control unit can also comprise means for support for the internet of things, to be used in the sensor operations and/or control signal delivery to the system elements or parts thereof.

FIG. 6F is illustrative of valve operations in an exemplified embodiment of an MFPU according to the FIGS. 6 to 6E. V1, V2, V3, V4, V5, V6, V7, V8 and V9 are indicated in the FIG. 6F as valves, the openings and closings that have been phased for the operation to spare water. Valves in the example of FIG. 6F belong to the ensemble of valves 99 in suitable part. The light shells are indicative of a valve open and the dark ones indicative of being closed. The valves V2 and V6 operate as feeding water to the tubes 603 (FIG. 6). In an open position these valves facilitate the water circulation back to the upstream, provided that V4 and V8 are in an open position, i.e. open for a fish to enter to the elevation tube 3 via the leading volume at the VC. The V4 and V8 are flap valves, for the fish safety, in an embodiment. The valves V3 and V7 are shutting valves, to provide attraction water via the corresponding attraction water tube 610 (attraction water line illustrated by a dashed line) to the valve locations V4 and V8, so that the fish can follow their instinct to enter to the upstream leading passage, to elevation tube 3. In the embodiment the attraction water has been taken from the intake tube 1 such a branch, that provide the attraction water in addition to the operative water to the MFPU, for the ejector operation at the feeding point at the cone 601. The valves V1 and V5 are Flap valves, to provide access to the fish to the MFPU, their implementation to pivot at the upper edge hinge, so that the fish are not injured or in a danger thereto. The attraction water valve V9 is considered to be open all the time as the attraction water needed, to provide also a secondary attraction water from a shallow channel 610B under the interface piece 602, so to intensify the instinct of the fish to enter to the cone 601, and either tubes 603 via the corresponding flap valve V1 or V5, when in operation of an MFPU. According to an embodiment at least one of the valves V3, V7, V9 is a controllable valve, also valves V2 and V6 can be controllable between the closed and open states. According to an embodiment at least one of them is/are fed from a line that provides the attraction water via a pump.

According to an embodiment at least one of the valves V3, V7 and V9 is controllable by an electric control signal, to set the flow, between fully open and closed states. V2 and V6 are operable to provide also attraction water, as such as feeding the ejector operation. However, when the V1 and V5 were shut, attraction water can be delivered downstream via the valve V9 and the shallow channel 610B, to the cone so that the fish can find the correct flaps leading upstream the river. The tubes 603, as well as the pontoons 501 are not drawn to the FIG. 6F for the clarity of the valves related details.

TABLE 1

|   | V1 | V2 | V3 | V4 | V5 | V6 | V7 | V8 | V9 |
|---|----|----|----|----|----|----|----|----|----|
| 1 | open | close | open | close | close | open | close | open | open |
| 2 | close | open | close | open | open | close | open | close | open |
| 3 | open | close | open | close | close | open | close | open | open |
| 4 | close | open | close | open | open | close | open | close | open |
| 5 | open | close | open | close | close | open | close | open | open |
| 6 | close | open | close | open | open | close | open | close | open |
| 7 | open | close | open | close | close | open | close | open | open |
| 8 | close | open | close | open | open | close | open | close | open |

In Table 1, the Valves V1 to V9 phasing embodied with indicated 8 phase example. V1, V4, V5 and V8 are embodied as flap valves 608, to be used for the fish entry to the MFPU and to the elevation tube 3. Valves V2 and V6 are embodied as shutting valves, 300 mm for example. Valves V3 and V7 are embodied as shutting valves, 150 mm for example. Valve V9 is embodied as control valve for attraction water.

FIG. 7 illustrates Illustration of an example about embodied anchoring an MFPU or UPFM to the riverbed bottom by a system element. In an example of embodiments of the invention about the system elements for anchoring 700, and interfacing 701 the anchoring to the MFPU, that are used to anchor the MFPU to the riverbed bottom and/or pool bottom, the dashed line is used to indicate optionality to use interface, where such would be beneficial because of the riverbed bottom formation for example. Such an anchoring element 700 as a system element can be lifted away from the riverbed, separately, or with a mounting chassis for mounting the MFPU, UPFM and/or the tubes, guiding nets and/or valves as appropriate in suitable part. For example, ice break up related damages to the system or its elements can be thus avoided whether there is ice in the river. The interface can use concrete, wires, beams, bolts and/or bars in the attachments. Also quick locks can be used in suitable part, especially in such embodiments where the interfacing is meant to be seasonal and/or even temporal.

FIG. 8 illustrates a migratory fish passage according to an embodiment of the invention as a scheme illustration. FIG. 8 illustrates an operational scheme: Migratory fish passage arrangement, comprising feeding points of multi-collection embodiment. It has a collecting point ensemble in accordance with the FIG. 3 as parallel operative arranged arrangement part. In the Fig, the Fish F is guided by the guide G near the feeding point 2 and therefrom to the elevation tube 3, along its branch up to the outlet 5. The elevation tube in the example of the FIG. 8 is implemented as a parallel fed embodiment so that one elevation tube is fed by an ensemble of feeding lines each from a feeding point. The example also shows that the same intake tube 1 is feeding all the four exemplified feeding points, but the invention is not limited only to the shown example of number of feeding points, number of elevation tubes, number of branches or to the example of the tube topologies as exemplary embodied. A skilled person in the art can vary the tubular structures and the branching as based on the embodiments of the invention to provide the flow arrangement with a number of feeding points for a certain flow in the elevation tube when the pumping capacity and the needed pressure difference values are given. At the branch of the tube 603 and the elevation tube 3 a valve has been embodied. Where applicable, the VC has been considered as an extension of the 603 towards the elevation tube 3.

FIG. 9 illustrates an exemplary operation scheme as a 3-d illustration about an arrangement of FIG. 8 according to an embodiment of the invention, but in the example only such an embodiment is exemplified in which there are only three branches in the hydraulic flow arrangement, constituting the migratory fish passage arrangement. Also one branch is indicated with an MFPU, without intention to limit the number of the MFPU to the shown example only. However, the number of branches from the feeding points 2 to collect the flows therefrom, or the branches of the intake tube 1 to the feeding points, is not limited only to the said example, but can be practically any number suitable according to the riverbed formation and/or the river system applied to. According to an embodiment the river can be of a river type of a natural river, built river, and/or a river whose riverbed has been artificially built, in suitable part, also in composition of the mentioned river types. Attraction water 10 feed has been indicated as an example.

FIG. 10 demonstrates a migratory fish passage arrangement as an example, where the fish outlet 5 in riverbed is located upstream, but near the dam, in this context to the pool at the dam or the pool entrance. In the exemplary embodiment the fish exit at the outlet 5, from the migratory fish passage near the dam 4, to a location upstream of the dam. Although the example shows a bottom near location of the outlet 5, the outlet 5 can be nearer to the surface, especially when there is a pump 7 present in the system to compensate pressure differences and/or flow originating pressure losses. In the embodiment example, the feeding points 2 are positioned to a further distance along the riverbed than the outlet 5, but it is not an intention to limit the embodiments only to the topology and/or relative distances of the example shown.

Although as shown in the embodiment example, the guide G guiding the fish to the bottom, to the feeding point 2 near the bottom, for the entry for the upstream migration via the MFPU at the riverbed bottom. According to an embodiment variant the feeding point 2 can be arranged near the surface at the downstream location. According to an embodiment, an ensemble of feeding points can be used, placed on different water levels, so that fish according to their instincts can select into which feeding point to access. According to an embodiment, a guide G can be formed to guide the fish from the bottom towards the feeding point. The guide G can be made of such net material that the fish can observe and realize not to collide with it. Although the pump 7 is embodied to an upstream location, such as that for example of an UPFM, for example, the pump 7 can be also embodied to the MFPU downstream where applicable.

Although the texture indicative of the guide G has been drawn as a net-like, in addition to net, or instead of net, also perplex or other transparent materials can be used in suitable part in the embodiments to guide fish. It is also possible to make guides from transparent materials equipped with similar markings that the fish can see. According to an embodiment, a guide is made of perforated transparent material so as to facilitate water exchange between the sides of the guide. In the exemplified embodiment, the pump 7 is used to provide the pressure differences so that the water intake 12 can take water to the arrangement to be delivered to the MFPU and the feeding point 2 which thus can suck water and the fish into it, to the propagation in the elevation tube 3, to be released from the outlet 5.

Examples on embodiments according to the invention are illustrated in FIG. 11. The embodied arrangement of the migratory fish passage, the fish outlet 5 in riverbed upstream the dam 4 is placed further from the dam than in FIG. 10 exemplary embodiment. Anyhow the fish are planned to exit at the outlet 5 from the migratory fish passage arrangement to a further upstream location from the dam as embodied. The further upstream location can be in the riverbed, upstream of the pool at the dam or its entrance, even at a bay at the riverbed. In the example, the feeding point is embodied near to the river bed bottom, but the location selection is not limited only to the shown embodiment. The location at a water level can be selected according to the fish species in the river, according to the fish species specific behavior.

FIGS. 12 and 13 illustrate embodiments of a system, based on the migratory fish passage using MFPUs and/or UPFMs in suitable part, by an operational scheme exemplifying system parts for fish passage past the turbine, from an upstream location of the riverbed to a downstream location of the riverbed, from a position near the dam (FIG. 12) and further from the dam (FIG. 13). In both examples, the fish passage passing the turbine" has been embodied. In the system embodied, there is, in addition to a migratory fish passage according to an embodiment of the invention by using which the fish access the spawning sites upstream of the dam, also a return route downstream facilitated by the fish passage past the turbine. The fish passage past the turbine is based according to an embodiment variant of the system part on a siphon, which according to a further embodiment variant is continuously in operation when mounted to the river bed.

However, according to an optional embodiment, an optional generator 139 can be located at the downstream location to the siphon tube 134 end, so that when there is no fish at the fish gate 133, as indicated by the sensor 132, in the siphon tube flowing water is guided to the generator 139, to be used for electricity production, but when a fish is present, some of the water with the fish is guided to the fish gate, but so that the fish cannot injure itself at the generator. This can be achieved by a valve that has two positions to be selected, according to the control of the sensor, and suitable timing in the flow.

According to an embodiment variant, fish are allowed to gather to a location upstream of the riverbed, at or near the dam or further away from the dam, by using a net formation to guide the fish by a guide 131 to guide the fish to the desired gathering site, considered also as an upstream feeding point, to be fed into the siphon tube 134, from which the fish then are guided to a fish gate 133 downstream, past the dam along the passage formed from the tube, so that an upstream located sensor 132 triggers the fish gate to let the fish upstream to go for the voyage downstream along the siphon tube. The sensor can be embodied at either end of the siphon tube, in the tube or at some other nearby location, to detect the fish entry to initiate the fish gate opening as a response with a suitable reaction time to spare water if necessary. In such embodiments, the fish gate can be kept open more optimally if there were more fish on the way in the siphon tube than fits therein simultaneously. The oxygen and/or carbon dioxide content of the water in the siphon tube can be monitored and measured with a similar sampling as explained in association with the sampling point arrangements in the elevation tube. The number of fish can thus be counted and/or the number in the siphon tube controlled by the fish gate.

According to an embodiment variants in regards to the examples in FIGS. 12 and/or 13, an MFPU and/or UPFM can be used in suitable part for providing the fish access as guided into the siphon tube at an upstream location and/or exit at a downstream location out of the siphon tube, in suitable part.

Example of passage pass the turbine has been illustrated in the FIG. 14 as an operational scheme.

According to an embodiment of the invention, the dam 4 has a passage past the turbine and/or migratory fish passage as system elements. According to an embodiment, the dam 4 comprises the migratory fish passage system. Although the siphon tube 134 has been drawn as having its path in the power plant and even through the dam 4, the example is not limiting the embodiments of the siphon tube routing only to the shown layout, but the siphon tube detailed routing would be dependent on the local conditions and the landscape at the power plant site, to choose also other routing options where economically, technically and/or esthetically speaking so selectable.

A guide 131 prevents fish to enter to the turbine. The waters force the fish to the bottom in this embodiment. Sensor 132 sends control command to a downstream end of the siphon tube 134. Valve 133 operating as a fish gate opens and water guides the fish from the net bottom pass the turbine. If no fish present, the valve 133 is closed and waters go into the turbine, and/or the marginal portion of the total flow, via the generator 139.

According to an embodiment of the invention, a power plant as a system element comprises a migratory fish passage and/or passage past the turbine arrangements constituting the system comprising said system parts according to the corresponding embodied system variants. Water power plant according to an embodiment of the invention has a dam according to an embodiment of the invention.

A system according to an embodiment of the invention comprises at least one of the following: A guide, a net, a guiding net, catching net, a transparent guide, sampling point for the water and/or the fish or a part thereof, fish counting apparatus and/or a part thereof, control unit, turbine, generator. According to an embodiment variant of the invention, the net is a net from an arrangement of nets that are arranged to classify the fish according to their size, by the net opening size so as to enable the fish that are smaller than the net opening to go through the net opening. When the openings, the mesh size, are getting smaller, the penetrating fish size also gets smaller. When the net is made of stiff material, the fish do not mess and stack to the net but get through so that the fish from the fenced volume net fencing volume the fish are countable by a suitable port system, and/or removed from the volume as coarse fish to be further utilized as food to household animals, for example.

Such a net/guide arrangement can be positioned at least to one end of the migratory fish system element tubes. According to an embodiment, each fish size can have a size specific siphon tube and/or elevation tube, or a corresponding branch, to facilitate the fractional studies of the fish in each class.

The net can be replaced or supplemented in suitable part by a suitable guide of transparent or opaque guide, or by other suitable structure which passes light.

A system according to an embodiment of the invention can comprise also at least one of the following: a fish proximity sensor and/or a part thereof, such an automated gate that is arranged to operate in response to an initiation of an active fish proximity sensor to open the gate and/or to close the gate. According to an embodiment variant, the gate opening can be further used as an initiation to activate another system part to the operational readiness, either instantly or with a pre-set time delay according to the system part location and function specifically. Accordingly the fish that triggered the gate opening can get filmed at the sampling port by the camera system attached thereto, or at another suitable location in the system that comprises the camera system for the purpose.

If there are many fish in the tubes leading the waters between the upstream and downstream locations, the migratory fish passage system can comprise at least one of the following: oxygen generator and aeration device, to produce oxygen to the water and consequently for the fish in the tubes, according to the monitoring signal of the oxygen and/or carbon dioxide concentration in the water.

EXAMPLE 1

The migratory fish passage as an arrangement is embodied as a hydraulic flow arrangement, implemented by an MFPU that comprises, according to an embodiment of the invention, a flow formation to provide an ejector action (FIG. 6, 606, 607) in an ejector piece, which is arranged in the arrangement to connect a flow from an intake tube, at least to a feeding point to provide an access to a fish to the elevation tube and further to the outlet via the passage in the elevation tube, to each other, so that waters from the intake tube make the ejector action so that water is sucked in the tube 603 (FIG. 6) into the elevation tube. According to an embodiment of the invention the migratory fish passage arrangement is using at least one MFPU and/or at least one UPFM.

According to an embodiment, the elevation tube has at the beginning of the tube, or just before the joining to an MFPU a formation that has a shape of a kind of a vena contracta VC, or a half of such with an exit angle $\alpha$, (in respect of the MFPU, see FIG. 6) at an MFPU at its outlet side, so formed that the cone angle of the wall material of the elevation tube in respect to the flow direction forms a vena contracta at a vena contracta regime, near at the beginning of the elevation tube, at the beginning of the elevation tube. According to an embodiment, the angle is an acceleration angle, to be cited also as an intake angle $\alpha$, in respect to the elevation tube. According to an embodiment of the invention, the vena contracta has such a formation at the input side of it to form a cone VC so that the conically shaped volume is defined as embodied in association to FIG. 6, the angle being cited as an exit angle, into which the flow from an MFPU exit when the flow enters the elevation tube. According to an embodiment the angle $\alpha$ in FIG. 6 example is schematically illustrated according to the choking, although the further distance than schematically indicated for the tubes 603 can be embodied with a different angle.

The feeding point has water entry part that has been embodied as a conical part in the FIGS. 6 and 6A, the water entry piece 601 having a conical form in respect to the flow direction, the feeding point cone $\beta$ being embodied as a free angle of explosion, to take water into the MFPU at the feeding point of the MFPU. The shape has been selected for minimization of flow-resistive effects originating to turbulence and/or counter-flow losses, to minimize the water flow deflection from the stream lines.

According to an embodiment of the invention, low level estimate of the intake angle $\alpha$ can be over 7°. According to another embodiment of the invention, the low level estimate of the intake angle $\alpha$ can be over 10°. According to further embodiment of the invention, the low level estimate of the intake angle $\alpha$ can be over 15°. According to even further embodiment of the invention, a high level estimate of the intake angle $\alpha$ is below 40°. According to another embodiment of the invention, the high level estimate of the intake angle $\alpha$ is below 30°. According to another embodiment of the invention, the high level estimate of the intake angle $\alpha$ is below 20°. According to an embodiment of the invention, the intake $\alpha$ angle is between a named low level estimate (for example 7°) and a named high level estimate (for example 40°), for example between 18°-28°.

According to an embodiment of the invention, the low level estimate of the feeding point cone angle $\beta$ can be over 10°. According to another embodiment of the invention, the low level estimate of the angle β can be over 15°. According to another embodiment of the invention, the low level estimate of the angle β can be over 25°. According to another embodiment of the invention, a high level estimate of the angle β is below 55°. According to another embodiment of the invention, the high level estimate of the angle β is below 40°. According to another embodiment of the invention, the high level estimate of the angle β is below 35°. According to an embodiment of the invention, the angle β is between a named low level estimate (for example 10°) and a named high level estimate (for example 55°), for example between 30°-45°.

According to an embodiment of the invention, the tube wall to flow direction angle, especially intake angle α and/or feeding point angel β is respectively constant at the each side of the form changing part of the MFPU. According to an embodiment, said constant is an average, so that there can be some steps, ridges or other uneven surfaces, for example because of the manufacture by a turning machine or traces of other working methods, but according to a variant embodiment, the surface can be made rough for purpose, for allowing mucus to attach and stay on the tube wall, in a similar way as in car motors the surface formation of the cylinders keep the motor oil for the lubrication, the mucus thus protecting the fish from injuries if hit the tube wall at the vena contracta or the surrounding surfaces inside the elevation tube.

According to an embodiment of the invention, at the choking volume at the Vena Contracta regime, the flow form changing part of it, at least one of the angles, intake angle α and/or feeding point angel β, follows a mathematical function. According to an embodiment, the mathematical function form is a line of a cone cross section function. According to an embodiment, the mathematical function is an exponential function, according to a further such embodiment variant, a series of exponential functions. According to an embodiment of the invention, the mathematical function is a lengthwise cross section line of a trumpet tube.

According to an embodiment of the invention, the after the ejector piece, the VC form at the VC regime, especially at the choking part, the α (but also and/or at the feeding point angel β) can be adjusted by a double-wall structure, so that at least one of said walls of the double wall facing to the choking volume in the tube is made of elastic material, thus making the distance of the walls adjustable according to the pressure of the medium in the double walled intermediate volume. Thus, the elasticity of the elastic part of the wall can influence to the form changes especially at the choke. The wall material thickness near or at the choking part can be thinner than at further-away locations, at the inside side of the embodied double walled structure, so to enable adjustment of at least one of the α angle can be changed dependently on the inter-wall pressure, and so to focus the variability of the form of the intake cone to the inside wall the flow tube.

According to an embodiment the choking part VC comprising a cone piece comprising at least one intake cone is arranged to set a flow to the elevation tube, from an ejector operated piece. According to an embodiment, the ejector piece and the choking part are modularly made and can be separated from each other to be maintained individually. The medium can be water and/or pressurized air or any combination thereof according to availability, especially if the suitable pressure for the optimum intake and exit angles can be maintained, for example by suitably selected pump or its side flow valve, or a water bar in a vertical position.

According to an embodiment of the invention, a tube 610 can have as attached a differently formed ejector formation to maintain the flow and/or to set the flow to a certain value, by the flow and/or pressure of the intake tube, the flow to be set by the intake tube flow, for the flow into the elevation tube.

According to an embodiment of the invention, the embodied use of an ejector formation as such for setting the flow into the VC and/or to the elevation tube, originates from a steam locomotive part of an injector suction side formation.

The embodied flows in suitable part can be set also by a valve controlled ensemble of ejectors or suitable flow-forming pieces via which the flows are controlled by the specific valves in an ensemble of valves being controlled to open and close between the fully open and fully closed states. The ensemble of valves can be embodied according to the FIG. 6F, and the controlled operation timed and/or phased according to the operational scheme shown, or, where appropriate, by a fish gate sensor controlled signal where applicable in suitable part.

EXAMPLE 2

According to embodiments of the invention that utilize a pump to compensate flow and/or other pressure losses, a redundant pump can be used in parallel as a spare component for achieving a redundant feature to the system. Thus, although some of the redundant featured pumps were in alternating operation, one can be serviced while another is in duty, or be reserved as an additional further pump in an ensemble of redundant pumps.

According to an embodiment of the invention, the ensemble of the pumps can comprise also differently operable pumps with a different structure and/or operating principle, to provide a diversity feature to the ensemble of pumps. The diversity feature is aimed against potential malfunctioning and/or breakage in a pump type specific way, so safeguarding the pumping operation by the pump ensemble.

According to an embodiment of the invention, the diversity feature and/or redundancy feature are/is arranged to an ensemble of valves that are used in the control the flows in the tube, and/or the fish access into the elevation tube and/or siphon tube to be transported.

According to an embodiment, the diversity feature and/or redundancy feature are/is arranged to an ensemble of system elements that are in same functional operation as system elements according to an embodiment of the invention.

EXAMPLE 3

According to an embodiment of the invention, an embodied tube, elevation tube, intake tube, feeding tube and/or the joining portion to the other system parts, a portion of the system parts has been in suitable part arranged to be mounted on to a chassis. According to an embodiment of the invention, the chassis (FIG. 6, 605) is made mechanically stiff, so that the embodied tubes do not necessarily need to be as stiff, i.e. self-supporting, as without such a chassis implemented arrangement, at the chassis area. Thus the arrangement can be lifted in suitable part that forms a MFPU or a UPFM away/back from/to the riverbed when breaking up of ice is expected to occur/be over. According to an embodiment, the chassis is a system element that is arranged to assist the system and its assembly. According to an embodiment, although comprising movable parts to be moved according to the seasons, the embodiments with the lifting feature are counted into solidly mounted embodiments.

EXAMPLE 4

According to an embodiment of the invention, an embodied chassis is anchored to the riverbed bottom as such (FIG. 7), directly, or into a pool (cf. FIG. 5B, items 503, 504), or to a specific anchoring piece (embodied as item 700 in FIG. 7). The anchoring piece as a system element is arranged to keep the attached and/or connected parts of the arrangement at a certain location of the riverbed, so that MFPU and/or UPFM being prevented moving away from the intended average location, with the waters and/or hitting the riverbed rocks, especially in those embodiments that use co-operatively buoy or pontoon for the tubings of the arrangement or system elements of the migratory fish passage system. According to an embodiment of the invention, the anchoring piece is made of concrete, stones, and/or steel or metal in suitable part and/or proportion, being formed according to the riverbed bottom matching form to suitable extent, to help the off-liftings and setting. The anchoring piece can be formed so that it can be handled with other system elements, within the same lift or in series by its own lifting turn. According to an embodiment, although comprising movable parts according to the seasons, the embodiments with the lifting feature are counted into solidly mounted embodiments.

EXAMPLE 5

According to an embodiment of the invention, the feeding point comprises a valve that is one of such in an ensemble of the valves 99 to provide access to a fish to enter into the migratory fish passage arrangement, to be transported upstream, or at an upstream feeding point location to the passage past the turbine to be transported downstream. Embodied valves are discussed further in detail in association of the FIG. 6F. According to an embodiment of the invention, the valve is arranged to have hinges at the upper edge of the flap for the pivot. It is suspected that the collision between a fish and the flap would not cause damages to the fish, or they are so minimized by the embodied pivoting direction of the flap, if not completely avoided.

According to an embodiment of the invention, the flap is formed in accordance of the access opening. According to an embodiment variant, the flap is rectangular, according to a further variant square formed. According to an embodiment, the tube at the feeding point is made of square formed tube so that with a same flow velocity, a larger mass flow can be achieved in comparison to the round cross-sectional tube with the same diameter as the square tube's edge.

EXAMPLE 6

According to an embodiment of the invention, the intake tube and the elevation tube are arranged in a co-axial way. According to an embodiment of the invention, the elevation tube is arranged inside the intake tube. According to a variant of embodiments, there can be an ensemble of elevation tubes. In such an ensemble, all the tubes need not be necessarily of same diameter, but some of the elevation tubes can be fish size specifically sized for a certain diameter according to the fish in the river system.

According to an embodiment of the invention, also the fish passage past the turbine from upstream location to downstream location has been embodied by the intake tube or its suitable part, as applicable. According to an embodiment variant, the siphon tube can be also in the same intake tube as the elevation tube, but according to a further variant of embodiment, separated in suitable part.

Nesting of the tubes as exemplified can be advantageous in steep mountains or similar conditions where the mounting is difficult or expensive, or remarkable space savings are needed. In such systems that use MFPUs and/or UPFMs at the locations downstream and/or upstream of the dam, the tubes and the insert and/or throughputs can be made according to the normal connections to connect the MFPUs and/or UPFMs according to the embodied purpose of the unit in question at the intended location.

EXAMPLE 7

According to an embodiment the system element or parts thereof can be coated with a coating against mechanical wear out. According to an embodiment of the invention, coating can be also made for anti-deposition purpose, where applicable. Skilled persons in the field know as such, when read and understood embodiments of the invention, how to coat for example a tube, join or valve as such with a DLC coating or other suitable coating against the wear out. According to an embodiment of the invention, tubes can be made also from material that is suitable for tolerate the mechanical and/or chemical wear out in the river system conditions. Especially, for example pH of the water system may be influencing to the material selections of different parts.

The scope of the embodiments for each patent claim is defined in the following claims. It is however clear to a skilled person in the art that the individual features of the embodiments can vary inside the inventive concept in accordance with the embodiment in question.

The invention claimed is:

1. A migratory fish passage unit for implementation of a migratory fish passage system including a hydraulic flow arrangement including an elevation tube and an intake tube,
    wherein the migratory fish passage unit is a modular integration unit configured to integrate into the hydraulic flow arrangement of the migratory fish passage system for transport of fish in a flow of the hydraulic flow arrangement, the migratory fish passage unit including a migratory fish passage, a branching piece, and connections configured to connect to the elevation tube and the intake tube to join the elevation tube and the intake tube to the branching piece in the migratory fish passage unit, the intake tube taking water from an upstream location to the branching piece to constitute hydraulic suction flow into a feeding point at the branching piece, to provide access by the hydraulic suction flow for the fish to enter through the branching piece into the elevation tube, the fish being transported in the hydraulic suction flow therein at which the feeding point is provided at the branching piece by the migratory fish passage unit such that the fish enter into a migratory fish passage leading to the elevation tube, are guided and transported in the elevation tube, and exit from the migratory fish passage to leave the hydraulic suction flow at an outlet point.

2. A migratory fish passage system comprising:
    the migratory fish passage unit according to claim 1,
    wherein the intake tube is configured to take water from the upstream location with respect to a dam, from a water intake point towards to a downstream location with respect to the dam, to the feeding point, at which a fish gate is disposed in order to provide the fish with access into the elevation tube from said feeding point for transportation of said fish in said elevation tube upstream the riverbed to an outlet point location, the water intake point being at a higher water level than said outlet point.

3. The migratory fish passage system according to claim 2, wherein the fish gate at the feeding point is configured to open as a response to an initiation of detection of fish presence nearby.

4. The migratory fish passage system according to claim 3, further comprising an attraction water feeding system configured to feed an attraction water flow to the feeding point.

5. The migratory fish passage system according to claim 3, wherein the hydraulic flow arrangement further comprises at least one of the following:
- an elevation tube sampling point at the elevation tube, which is positioned before the outlet, the elevation tube sampling point comprising a transparent part as a window for optical facilities to photograph and/or film on video fish passing in the elevation tube,
- a counter to count fish in the elevation tube,
- a laser light source,
- a source of white light,
- a cut-light-beam counter, to count the bypassing fish-caused-pulses and estimate a size of the fish accordingly based on pulse duration,
- a background scale to estimate the size of the fish,
- an automated counting system, connect to the Internet to facilitate remote counting via an information network,
- an absorption spectrometer based on light absorption by the water and its constituents at presence of the fish,
- a water lock at the elevation tube sampling point to facilitate fish-catching for individual measuring and/or returning fish back,
- an optical sampling point for optical facilities to further estimate the species of the fish and/or the size of the fish passing by the window in the elevation tube,
- an information network sampling point connected to an information network, and
- a database connected to an information network.

6. The migratory fish passage system according to claim 3, wherein the hydraulic flow arrangement further comprises at least one element of a net/guide arrangement of the following:
- a guide,
- a classification net from a plurality of classification nets configured to classify the fish according to sizes thereof, by an opening size of the classification nets, towards smaller fish size fraction of penetrating fish in a progressive series of classification nets,
- a guiding net,
- a catching net,
- a transparent guide that passes light,
- an opaque guide that passes light,
- a sampling point for the water and/or the fish or a part thereof,
- a fish counting apparatus and/or a part thereof,
- a controller,
- a turbine, and
- a generator, and
- a port to classify fish according to size thereof.

7. The migratory fish passage system according to claim 6, wherein the net/guide arrangement is positioned at least at one end of one or more of the elevation tube and the intake tube.

8. The migratory fish passage system according to claim 2, further comprising an attraction water feeding system configured to feed an attraction water flow to the feeding point.

9. The migratory fish passage system according to claim 2, further comprising an ejector formation piece at the feeding point location, the ejector formation piece being configured to create a suction flow into the elevation tube to feed water from the feeding point towards the outlet point.

10. The migratory fish passage system according to claim 2, wherein said intake tube comprises a pump to compensate at least the pressure loss of the tubular flow of the intake tube.

11. The migratory fish passage system according to claim 10, wherein the pump is disposed at or near the water intake point to increase the pressure in the intake tube.

12. The migratory fish passage system according to claim 2, wherein the dam in the riverbed is a flow barrier.

13. A system to guide a migratory fish to pass a dam, the system comprising:
- the migratory fish passage unit according to claim 1; and
- a siphon tube configured to siphon from an upstream location with respect to the dam to a downstream location with respect to the dam to constitute a migratory fish return route,
- wherein at least one of the elevation and intake tubes and the siphon tube is sized specifically according to a fish size known from a river system in which the hydraulic flow arrangement is disposed to transport said fish upstream and/or downstream.

14. The system according to claim 13, further comprising a gate configured to allow a fish to pass,
wherein the system is configured to open a flow in a tube, by opening to the flow direction, when at least one of the following occur, based on a sensor:
- when a fish is at said gate at an upstream location of said siphon tube, about to go downstream,
- when a fish is at said gate at a downstream location of said siphon tube, about to go downstream out of the siphon tube,
- when a fish is at said gate at a downstream location of the elevation tube, about to enter the elevation tube, and
- when a fish is at said gate at an upstream location of the elevation tube, to exit the elevation tube and/or when a fish is at the gate at an intermediate location in a tube which is one of at least one of said elevation tube and siphon tube, therebetween the upstream location and downstream location of said tube.

15. The system according to claim 14, further comprising a sensor at the gate configured to sense the presence of fish at a distance to initiate the gate opening according to a threshold to activate the gate to open at said tube.

16. The system according to claim 13, further comprising a fish guiding formation at an end of one of the elevation and intake tubes and the siphon tube to guide the fish into at least one of said elevation and intake tubes and the siphon tube, out of at least one of said elevation and intake tubes and the siphon tube, and/or to prevent the fish from entering turbine tunnels.

17. The system according to claim 13, further comprising a bottom formation at the riverbed bottom to prevent sawyers from entering turbine tunnels or from damaging elements of the system.

18. The system according to claim 13, further comprising at least one of the following: a dam, a generator, another flow barrier, a fish ladder, a river water passage, river water, a riverbed, the fish caught from the system, a net, a guide, a catching net, a sampling interface for water and/or to fish, a part of the sampling interface, a fish counting apparatus or a part thereof, an imaging apparatus of the fish, said imaging apparatus the imaging apparatus being configured to take still pictures and/or including an apparatus for taking video, a water power plant, a mill, an apparatus to utilize water flow energy, a utility plant to utilize the water flow energy, pump, a production unit to produce the energy to said pump, such as a mechanical flow energy production device, electricity production unit, a turbine, a turbine tunnel, an aggregate, an UPFM and/or combustion utility, a combustion engine, a fish sensor to sense proximity of fish at a gate location, and an automatic gate that is arranged to responsively open and/or close according to an initiation of the fish sensor to sense the proximity of the fish at a gate location.

19. The system according to claim 13, further comprising an aeration apparatus and/or an oxygen generator to secure the oxygen for the fish in a tube of the system.

20. The migratory fish passage unit of claim 1, further comprising at least one pontoon or buoy.

21. The migratory fish passage unit of claim 1, further comprising a connector-to-anchoring piece to anchor the migratory fish passage unit to a river bed bottom or to a river pool.

22. The migratory fish passage unit according to claim 1, further comprising at least one of the following:
   a valve system including an ensemble of valves including an attraction water valve,
   a valve system valve opening and closing controller,
   a fish gate to control fish access via the migratory fish passage unit,
   a pontoon or a buoy, and
   an anchoring interface to anchor the migratory fish passage unit to a pool at the bottom of a riverbed.

23. A migratory fish passage unit for implementation of a migratory passage system, the migratory fish passage unit comprising:
   a hydraulic flow arrangement for transport of fish in a flow, the hydraulic flow arrangement including
      an elevation tube,
      an intake tube, and
      a branching piece; and
   connections, at the branching piece, to connect the elevation tube and the intake tube to the branching piece so that the intake tube is configured to take water from an upstream location to the branching piece to constitute hydraulic suction flow into a feeding point at the branching piece, to provide access for the fish to enter into the elevation tube to be transported in the flow therein in the elevation tube, and exit to leave the flow at an outlet point,
wherein the intake tube is configured to take water from the upstream location with respect to a dam, from a water intake point towards to a downstream location with respect to the dam, to the feeding point, at which a fish gate is disposed in order to provide the fish with access into the elevation tube from said feeding point for transportation of said fish in said elevation tube upstream the riverbed to an outlet point location, the water intake point being at a higher water level than said outlet point,
wherein the fish gate at the feeding point is configured to open as a response to an initiation of detection of fish presence nearby,
wherein the hydraulic flow arrangement further comprises at least one element of a net/guide arrangement of the following:
   a guide,
   a classification net from a plurality of classification nets configured to classify the fish according to sizes thereof, by an opening size of the classification nets, towards smaller fish size fraction of penetrating fish in a progressive series of classification nets,
   a guiding net,
   a catching net,
   a transparent guide that passes light,
   an opaque guide that passes light,
   a sampling point for the water and/or the fish or a part thereof,
   a fish counting apparatus and/or a part thereof,
   a controller,
   a turbine, and
   a generator, and
   a port to classify fish according to size thereof,
wherein the net/guide arrangement is positioned at least at one end of one or more of the elevation tube and the intake tube, and
wherein in the net/guide arrangement, each fish size according to a classification has a size specific siphon tube and/or elevation tube, or a corresponding branch, to facilitate fractional classification studies of the fish in each size class.

* * * * *